US011013234B2

(12) United States Patent
Nonomura

(10) Patent No.: US 11,013,234 B2
(45) Date of Patent: May 25, 2021

(54) FORMULATIONS AND METHODS FOR TREATING PHOTOSYNTHETIC ORGANISMS AND ENHANCING QUALITIES AND QUANTITIES OF YIELDS WITH GLYCAN COMPOSITE FORMULATIONS

(71) Applicant: Innovation Hammer LLC, Powell, OH (US)

(72) Inventor: Arthur M. Nonomura, Litchfield Park, AZ (US)

(73) Assignee: Innovation Hammer LLC, Powell, OH (US)

( * ) Notice: Subject to any disclaimer, the term of this patent is extended or adjusted under 35 U.S.C. 154(b) by 0 days.

(21) Appl. No.: 15/492,110

(22) Filed: Apr. 20, 2017

(65) Prior Publication Data
US 2017/0311598 A1 Nov. 2, 2017

Related U.S. Application Data

(60) Provisional application No. 62/329,226, filed on Apr. 29, 2016.

(51) Int. Cl.
*A01N 43/16* (2006.01)
*A01N 59/00* (2006.01)
*A01N 55/02* (2006.01)
*A01N 63/10* (2020.01)
*A01N 65/00* (2009.01)
*A01N 63/02* (2006.01)

(52) U.S. Cl.
CPC ............ *A01N 43/16* (2013.01); *A01N 55/02* (2013.01); *A01N 59/00* (2013.01); *A01N 63/10* (2020.01); *A01N 65/00* (2013.01)

(58) Field of Classification Search
USPC ......................................................... 504/117
See application file for complete search history.

(56) References Cited

U.S. PATENT DOCUMENTS

| | | |
|---|---|---|
| 3,245,776 A | 4/1966 | Rubin |
| 3,578,619 A | 5/1971 | Reeder |
| 4,111,678 A | 9/1978 | Downer |
| 4,264,478 A | 4/1981 | Seldner |
| 4,338,432 A | 7/1982 | Lawson et al. |
| H224 H | 3/1987 | Malik et al. |
| H303 H | 7/1987 | Malik et al. |
| 5,241,781 A | 9/1993 | Malczyk |
| 5,413,928 A | 5/1995 | Weathers et al. |
| 5,458,837 A | 10/1995 | Roberts et al. |
| 5,549,718 A | 8/1996 | Lerouge et al. |
| 5,549,729 A | 8/1996 | Yamashita |
| 5,634,959 A | 6/1997 | Beaty |
| 5,688,981 A | 11/1997 | Nonomura |
| 5,767,378 A | 6/1998 | Bojsen et al. |
| 5,797,976 A | 8/1998 | Yamashita |
| 5,958,104 A | 9/1999 | Nonomura et al. |
| 5,962,717 A | 10/1999 | Nonomura et al. |
| 5,965,150 A | 10/1999 | Wada et al. |
| 5,993,504 A | 11/1999 | Nonomura et al. |
| 6,020,288 A | 2/2000 | Nonomura et al. |
| 6,032,409 A | 3/2000 | Obonai et al. |
| 6,092,302 A | 7/2000 | Berrigan |
| 6,110,867 A | 8/2000 | Glenn et al. |
| 6,258,749 B1 | 7/2001 | Nonomura |
| 6,309,440 B1 | 10/2001 | Yamashita |
| 6,318,023 B1 | 11/2001 | Yamashita |
| 6,358,293 B1 | 3/2002 | Nonomura |
| 6,407,040 B1 | 6/2002 | Nichols |
| 6,440,907 B1 | 8/2002 | Santora et al. |
| 6,451,739 B1 | 9/2002 | Kober et al. |
| 6,464,995 B1 | 10/2002 | Sekutowski et al. |
| 6,544,511 B2 | 4/2003 | Nishimura et al. |
| 6,699,977 B1 | 3/2004 | Gerrish et al. |
| 6,730,537 B2 | 5/2004 | Hutchison et al. |
| 6,746,988 B2 | 6/2004 | Hopkinson et al. |
| 6,826,866 B2 | 12/2004 | Moore et al. |
| 6,960,705 B2 * | 11/2005 | Wei .......... A01N 37/46 800/301 |
| 8,093,182 B2 | 1/2012 | Nonomura |

(Continued)

FOREIGN PATENT DOCUMENTS

| | | |
|---|---|---|
| EP | 0811858 A2 | 12/1997 |
| EP | 1306403 A1 | 5/2003 |
| ES | 2110894 A1 | 2/1998 |
| GB | 1223044 A | 2/1971 |
| GB | 1268308 A | 3/1972 |
| JP | 63-33310 A | 2/1988 |
| JP | 2001-275498 A | 10/2001 |
| JP | 2003-517410 A | 5/2003 |
| JP | 2004-123677 A | 4/2004 |
| JP | 2006-502125 A | 1/2006 |
| JP | 2008-1550 A | 1/2008 |
| JP | 2013-532642 A | 8/2013 |
| JP | 2014-533507 A | 12/2014 |

(Continued)

OTHER PUBLICATIONS

Australian communication dated Sep. 14, 2018 in co-pending Australian patent application No. 2017245459.

(Continued)

*Primary Examiner* — Johann R Richter
*Assistant Examiner* — Courtney A Brown
(74) *Attorney, Agent, or Firm* — Nields, Lemack & Frame, LLC

(57) ABSTRACT

Glycan Composites and methods for rendering glycan composites for the treatment of photosynthetic organisms, including the steps of formulating branched glycan deglycosylates into coordination complex compositions resulting in water-borne availability; stability during storage; applying a suitable volume of the resulting mixture to one or more photosynthetic organisms; delivery to photosynthetic organisms; metabolically based growth of crops; enhanced qualities and increased quantities of crops; and systems and compositions for the same.

19 Claims, 2 Drawing Sheets

(56) References Cited

U.S. PATENT DOCUMENTS

| | | |
|---|---|---|
| 8,278,090 B1 | 10/2012 | Im et al. |
| 8,932,652 B2 | 1/2015 | Dillon et al. |
| 8,937,054 B1 | 1/2015 | Martin |
| 8,956,852 B2 | 2/2015 | Im et al. |
| 9,072,304 B2 | 7/2015 | Nonomura |
| 9,277,697 B2 | 3/2016 | Nonomura |
| 9,374,955 B2 | 6/2016 | Nonomura |
| 9,828,299 B2 | 11/2017 | Nonomura |
| 10,010,029 B2 | 7/2018 | Nonomura |
| 2001/0003596 A1 | 6/2001 | Finnie et al. |
| 2002/0177654 A1 | 11/2002 | Erdem et al. |
| 2003/0128428 A1 | 7/2003 | Anderson |
| 2004/0171524 A1 | 9/2004 | Davis |
| 2005/0144670 A1 | 6/2005 | Fujiyama et al. |
| 2005/0152146 A1 | 7/2005 | Owen et al. |
| 2005/0268679 A1 | 12/2005 | Josef |
| 2006/0142158 A1 | 6/2006 | Nonomura |
| 2006/0178270 A1 | 8/2006 | Chevolot et al. |
| 2007/0056053 A1 | 3/2007 | Gray et al. |
| 2007/0167398 A1 | 7/2007 | Dillon et al. |
| 2008/0194407 A1 | 8/2008 | Ashmead et al. |
| 2010/0081619 A1 | 4/2010 | Tedford et al. |
| 2011/0123803 A1 | 5/2011 | Yamanaka et al. |
| 2011/0143941 A1 | 6/2011 | Archer |
| 2011/0244011 A1 | 10/2011 | Jongedijk et al. |
| 2012/0017491 A1 | 1/2012 | Gutsmann et al. |
| 2012/0077679 A1 | 3/2012 | Nonomura |
| 2012/0264177 A1 | 10/2012 | Avila et al. |
| 2013/0004554 A1 | 1/2013 | Dillon et al. |
| 2013/0283685 A1 | 10/2013 | Qin et al. |
| 2013/0334090 A1 | 12/2013 | Drew |
| 2014/0331555 A1* | 11/2014 | Nonomura ............ A01G 22/00 47/65.5 |
| 2015/0133298 A1 | 5/2015 | Nonomura |
| 2015/0250117 A1 | 9/2015 | Nonomura |
| 2015/0250171 A1 | 9/2015 | Nonomura |
| 2015/0284299 A1 | 10/2015 | Coutant et al. |
| 2015/0366195 A1 | 12/2015 | O'Bryan et al. |
| 2017/0164562 A1 | 6/2017 | Nonomura |
| 2018/0325045 A1 | 11/2018 | Nonomura |
| 2020/0404912 A1 | 12/2020 | Nonomura |
| 2020/0404913 A1 | 12/2020 | Nonomura |

FOREIGN PATENT DOCUMENTS

| | | |
|---|---|---|
| KR | 10-2000-0075972 A | 12/2000 |
| KR | 10-2011-0079080 A | 7/2011 |
| WO | 93/25078 A1 | 12/1993 |
| WO | 99/12868 A1 | 3/1999 |
| WO | 99/60093 A1 | 11/1999 |
| WO | 00/54568 A1 | 9/2000 |
| WO | 01/47360 A2 | 7/2001 |
| WO | 01/56384 A1 | 8/2001 |
| WO | 2009/135049 A1 | 11/2009 |
| WO | 2013/176731 A2 | 11/2013 |
| WO | 2014/191691 A1 | 12/2014 |
| WO | 2015/128314 A1 | 9/2015 |

OTHER PUBLICATIONS

Japanese communication, with English translation, dated Oct. 10, 2017 in co-pending Japanese patent application No. 2017-041868.
Mexican communication, with English translation, dated Oct. 24, 2017 in co-pending Mexican patent application No. MX/2017/047891.
Australian communication dated Sep. 18, 2017 in co-pending Australian patent application No. 2016256817.
Chilean communication, with English translation, dated Sep. 15, 2017 in co-pending Chilean patent application No. 201403153.
Mexican communication dated Jun. 18, 2018 in co-pending Mexican patent application No. MX/a/2014/014070.
Final rejection dated Dec. 13, 2018 in co-pending U.S. Appl. No. 15/412,495.
Japanese communication, with English translation, dated Aug. 21, 2018 in co-pending Japanese patent application No. 2017-136563.
Office action dated Aug. 8, 2018 in co-pending U.S. Appl. No. 15/412,495.
Chilean communication, with English translation, dated Mar. 15, 2018 in co-pending Chilean patent application No. 201403153.
Mexican communication, with English translation, dated Sep. 25, 2018 in co-pending Mexican patent application No. MX/a/2014/014070.
Griffiths, Royal Horticultural Society/Index of Garden Plants, 1992, 1994, 10 pages.
Guerrini, et al., Journal of Experimental Botany,1994, vol. 45, No. 9, pp. 1227-1233, "The effect of calcium chelators on microsomal pyridine nucleotide-linked dehydrogenases of sugarbeet cells".
Hoagland, et al., California Agricultural Experiment Station, Circular 347, Revised Jan. 1950, pp. 1-32, "The Water-Culture Method for Growing Plants Without Soil".
Hyatt, et al., Heterocycles, vol. 35, No. 1, 1993, pp. 227-234, "The Intermediacy of Sulfate Esters in Sulfuric Acid Catalyzed Acetylation of Carbohydrates".
Ichimura, et al., Annals of Botany 83: 551-557, 1999, "Possible roles of Methyl Glucoside and Myo-inositol in the Opening of Cut Rose Flowers".
Ichimura, et al., Biosci. Biotech. Biochem., 61(10): 1734-1735, 1997, "Identification of Methyl B-Glucopyranoside and Xylose as Soluble Sugar Constituents in Roses".
Jakubowska, et al., Journal of Experimental Botany, vol. 55, No. 398, pp. 791-801, Apr. 2004, "The auxin conjugate 1-0-indole-3-acetyl-B-D-glucose is synthesized in immature legume seeds by IAGlc synthase and may be used for modification of some high molecular weight compounds".
Josine et al., "Advances in Genetic Engineering for Plants Abiotic Stress Control," African Journal of Biotechnology, vol. 10, No. 28, pp. 5402-5413, 2011.
Kaback, et al., PNAS, Jan. 9, 2007, vol. 104, No. 2, pp. 491-494, "Site-directed alkylation and the alternating access model for LacY".
Kamp, Hort Science 20(5): 879-881, 1985, "Control of Erysiphe cichoracearum on Zinnia elegans, with a Polymer-based Antitranspirant".
Kumar, "Synthesis Methods of Metal Chelates beta-ketoesters—(A Critical Review)", Oriental Journal of Chemistry, vol. 27, No. 1, p. 347-349, Dec. 31, 2011.
Lannoo, et al., Plant Cell Physiol. 2007, pp. 1-12, "The Jasmonate-Induced Expression of the nicotiana tabacum Leaf Lectin".
Lasswell, et al., The Plant Cell, vol. 12, pp. 2395-2408, Dec. 2000, "Cloning and Characterization of IAR1, a Gene Required for Auxin Conjugate Sensitivity in Arabidopsis".
Leclere, et al., Plant Physiology, Jun. 2004, vol. 135, pp. 989-999, IAR4, a Gene Required for Auxin Conjugate Sensitivityin Arabi . dopsis, Encodes a Pyruvate Dehydrogenase E1a Homolog.
Li, et al., Science, Oct. 7, 2005: 121-125, 1 pg. Abstract, "Arabidopsis H+-PPase A VP1 Regulates Auxin-Mediated Organ Development".
Markle, et al., Food and Feed Crops of the US, Jun. 1998, 2nd Edition, Revised, Descriptive List Classified According to Potentials for Pesticide Residues, 20 pages.
Miller, et al., Botanica Marina, vol. 45, 2002, pp. 1-8, "Evaluation of the Structure of the Polysaccharides from Chondria macrocarpa and Ceramium rubrum as Determined by 13C NMR Spectroscopy".
Moreshet, et al., Crop Science, vol. 19, Nov.-Dec. 1979, pp. 863-868, "Effect of Increasing Foliage Reflectance on Yield, Growth, and Physiological Behavior of a Dryland Cotton Crop".
Nonomura, et al., Advances in Photosynthesis—Fundamental Aspects, published Feb. 15, 2012, pp. 259-272, "The Path of Carbon in Photosynthesis—XVIII—Response of Plants to Polyalkylglucopyranose and Polyacylglucopyranose".
Nonomura, et al., Journal of Plant Nutrition, 34: 653-664, 2011, "The Path of Carbon in Photosynthesis. XXVII. Sugar-Conjugated Plant Growth Regulators Enhance General Productivity".
Nonomura, et al., Journal of Plant Nutrition, 35:12, pp. 1896-1909, 2012, "The Path of Carbon in Photosynthesis. XXIX. Glass Microbeads".
Nonomura, et al., Photosynthesis, 2013, Chapter 1, pp. 3-22, "The Path of Carbon in Photosynthesis, XXX, a-Mannosides", http://dx.doi.org/10.5772/55260, 22 pages.

(56) References Cited

OTHER PUBLICATIONS

Nonomura, et al., Proc. Natl. Acad. Sci., USA, vol. 89, pp. 9794-9798, Oct. 1992, "The path of carbon in photosynthesis: Improved crop yields with methanol".
Rao, Journal of Horticultural Science (1985), 60(1), pp. 89-92, "The effects of antitranspirants on leaf water status, stomatal resistance and yield in tomato".
Sheen, et al., Current Opinion in Plant Biology, 1999, 2: 410-418, "Sugars as signaling molecules".
Shen, et al., IEEE Transactions on Nanotechnology 4(5): 539-547, 1 pg. Abstract, 2005, "Synthesis and Characterization of Ni-P-CNT's Nanocomposite Film for MEMS Applications".
Soundara, et al., Agric. Sci. Digest, 1981, 1(4): 205-206, "Effect of Antitranspirants and Reflectants on Pod Yield of Rainfed Groundnut".
Stanhill, et al., Agronomy Journal, V. 68, Mar.-Apr. 1976, pp. 329-332, "Effect of Increasing Foliage and Soil Reflectivity on the Yield and Water Use Efficiency of Grain Sorghum".
Stroud, PNAS, Jan. 30, 2007, vol. 104, No. 5, pp. 1445-1446, "Transmembrane transporters: An open and closed case".
Taylor, et al., Annals of Applied Biology, vol. 57, No. 2, Apr. 1966, pp. 301-309, XP055046581, "Studies on plant growth-regulating substances: XXI. The release of pectic substances from wheat coleoptile tissue incubated with solutions of ethylenediamin etetraacetic acid".
Woodward, et al., Annals of Botany 95: 707-735, 2005, "Auxin: Regulation, Action, and Interaction".
Thomas, et al., In Vitro Cellular & Developmental Biology-Plant, vol. 36, No. 6, Nov. 2000, pp. 537-542, XP055046711, "Effects of photo-oxidative loss of FeNa2Edta and of higher iron supply on chlorophyll content, growth and propagation rate in triploid watermelon cultures".
Trademark Electronic Search System, US Patent and Trademark Office, UPPLAUSE, U.S. Appl. No. 78/889,879, registered Mar. 13, 2007 to registrant Innovation Hammer LLC, pp. 1-2, data accessed Feb. 25, 2012.
Akzo Nobel Functional Chemicals, Micronutrients—healthy crops for healthy profits Brochure, "User Recommendation Sheet—Dissolvine E-Mg-6", Jun. 2002, pp. 1-2, XP055046728.
Wolf, et al., J. Phycol., vol. 21, pp. 388-396, 1985, "Growth and Branched Hydrocarbon Production in a Strain of Botryococcus Braunii (Chlorophyta)".
Zbiec, et al., Electronic Journal of Polish Agricultural Universities, 2003, vol. 6, Issue 1, Series Agronomy, pp. 1-6, "Response of Some Cultivated Plants to Methanol as Compared to Supplemental Irrigation".
Zekaria-Oren, et al., Plant Disease/Mar. 1991, vol. 75, No. 3, pp. 231-234, "Effect of Film-Forming Compounds on the Development of Leaf Rust on Wheat Seedlings".
Ziv,et al., Plant Pathology (1987) 36, pp. 242-245, "The Effect of film-forming anti-transpirants on leaf rust and powdery mildew incidence on wheat".
Ziv, et al., Plant Disease/May 1992, vol. 76, No. 5, pp. 513-517, "Effects of Bicarbonates and Film-Forming Polymers on Cucurbit Foliar Diseases".
Office action dated Jun. 29, 2016 in co-pending U.S. Appl. No. 14/359,455.
Office action dated Oct. 20, 2016 in co-pending U.S. Appl. No. 14/359,455.
Final rejection dated Mar. 27, 2017 in co-pending U.S. Appl. No. 14/359,455.
Office action dated Apr. 11, 2016 in co-pending U.S. Appl. No. 14/397,718.
Office action dated Nov. 7, 2016 in co-pending U.S. Appl. No. 14/397,718.
Final rejection dated May 16, 2017 in co-pending U.S. Appl. No. 14/397,718.
International Search Report and Written Opinion dated Sep. 5, 2017 in corresponding PCT application No. PCT/US2017/028489.

Korean communcations, with English translation, dated Sep. 20, 2018 in co-pending Korean patent application No. 10-2014-7013877.
Canadian communication, dated Oct. 2, 2018 in co-pending Canadian patent application No. 2,856,580.
Notice of allowance dated Sep. 13, 2017 in co-pending U.S. Appl. No. 14/397,718.
European communication dated Dec. 13, 2012 in co-pending European patent application No. EP 05854833.
European communication dated Jun. 22, 2015 in co-pending European patent application No. 05854833.0.
International Search Report and Written Opinion dated Mar. 25, 2013 in co-pending PCT application No. PCT/US2012/065768.
International Preliminary Report on Patentability completed Oct. 14, 2013 in co-pending PCT application No. PCT/US12/65768.
European communication dated Sep. 16, 2015 in co-pending European patent application No. 12851712.5.
European communication dated Jan. 28, 2016 in co-pending European patent application No. 12851712.5.
Japanese communication, with English translation, dated Apr. 19, 2016 in co-pending Japanese patent application No. 2014-542541.
Australian communication dated Oct. 14, 2016 in co-pending Australian patent application No. 2012340849.
Japanese communication, with English translation, dated Dec. 6, 2016 in co-pending Japanese patent application No. 2014-542541.
Australian communication dated Mar. 14, 2017 in co-pending Australian patent application No. 2012340849.
International Search Report and Written Opinion dated May 13, 2013 in co-pending PCT application No. PCT/US13/29535.
International Preliminary Report on Patentability dated Aug. 13, 2014 in co-pending PCT application No. PCT/US13/29535.
European communication dated Nov. 25, 2015 in co-pending European patent application No. 13794107.6.
Eurasian communication, with English translation, dated Dec. 15, 2015 in co-pending Eurasian patent application No. 201492180.
Australian communication dated Dec. 17, 2015 in co-pending Australian patent application No. 2013266917.
Australian communication dated Apr. 14, 2016 in co-pending Australian patent application No. 2013266917.
Eurasian communication, with English translation, dated Aug. 22, 2016 in co-pending Eurasian patent application No. 201492180.
Canadian communication dated Sep. 15, 2016 in co-pending Canadian patent application No. 2,872,173.
Eurasian communication, with English translation, dated Mar. 15, 2017 in co-pending Eurasian patent application No. 201492180/28.
Canadian communication dated May 25, 2017 in co-pending Canadian patent application No. 2,872,173.
European communication dated Apr. 26, 2017 in co-pending European patent application No. 13794107.6.
Aubert, et al., Journal of Experimental Botany, vol. 55, No. 406, pp. 2179-2189, Oct. 2004, "Methyl-B-glucopyranoside in higher plants: accumulation and intracellular localization in Geum montanum L. leaves and in model systems studied by 13C nuclear magnetic resonance".
Bacic, et al., Australian Journal of Plant Physiology 8(5), 1981, pp. 475-495, Abstract, "Chemistry and Organization of Aleurone Cell Wall Components From Wheat and Barley".
Baradas, et al., Agronomy Journal, V. 68, Nov.-Dec. 1976, pp. 848-852, "Reflectant Induced Modification of Soybean Canopy Radiation Balance V. Longwave Radiation Balance".
Barratt, et al., Physiologia Plantarum 105: 207-217, 1999, "Metabolism of exogenous auxin by *Arabidopsis thaliana*: Identification of the conjugate N-(indol-3-ylacetyl)-glutamine and initiation of a mutant screen".
Benson, Annual Review of Plant Biology, 2002, 53:1-25, "Paving the Path".
Benson, Photosynthesis Research 73: 29-49, 2002, "Following the path of carbon in photosynthesis: a personal story".
Benson, et al., Journal of Plant Nutrition, 32: 1185-1200, 2009, "The Path of Carbon in Photosynthesis: XXV. Plant and Algal Growth Responses to Glycopyranosides".

(56) References Cited

OTHER PUBLICATIONS

Benson, et al., Photosynthesis Research: An International Journal, vol. 34, No. 1, Oct. 1992, 1 pg. Abstract, P-522, "The Path of Carbon in Photosynthesis: Methanol Inhibition of Glycolic Acid Accumulation".
Biel, et al., Journal of Plant Nutrition, 33: 902-913, 2010, "The Path of Carbon in Photosynthesis. XXVI. Uptake and Transport of Methylglucopyranoside Throughout Plants".
Brewer, et al., Proc. Nat. Acad. Sci, USA, vol. 70, No. 4, pp. 1007-1111, Apr. 1973, "Binding of 13C-Enriched a-Methyl-D-Glucopyranoside to Concanavalin A as Studied by Carbon Magnetic Resonance".
Calvin, et al., Science, New Series, vol. 107, No. 2784, May 7, 1948, pp. 476-480, "The Path of Carbon in Photosynthesis".
Calvin, Melvin Calvin Nobel Lecture, Dec. 11, 1961, pp. 618-644, "The path of carbon in photosynthesis".
Carpin, et al., Plant Cell, vol. 13, pp. 511-520, Mar. 2001, "Identification of a Ca2+-Pectate Binding Site on an Apoplastic Peroxidase".
Catoire, et al., Eur Biophys J (1998) 27: 127-136, "An efficient procedure for studying pectin structure which combines limited depolymerization and 13C NMR".
Cheng, et al., Department of Pharmacy, National University of Singapore, Taylor & Francis, vol. 30, No. 4, 2004, pp. 359-367, 1 pg. Abstract, "Insulin-Loaded Calcium Pectinate Nanoparticles: Effects of Pectin Molecular Weight and Formulation pH".
Comparot, et al., Journal of Experimental Botany, vol. 54, No. 382, pp. 595-604, Jan. 2003, "Function and specificity of 14-3-3 proteins in the regulation of carbohydrate and nitrogen metabolism".
Cortes, et al., Plant Physiology, Feb. 2003, vol. 131, pp. 824-837, "In Plants, 3-O-Methylglucose Is Phosphorylated by Hexokinase But Not Perceived as a Sugar".
Decreux, et al., Plant and Cell Physiology, 2005, 46(2): 268-278, "Wall-associated Kinase WAK1 Interacts with Cell Wall Pectins in a Calcium-induced Conformation".
Easterwood, Fluid Journal, vol. 10, No. 36, Jan. 2002, 3 pages, XP055046731, "Calcium's Role in Plant Nutrition".
Fall, et al., Trends in Plant Science, Sep. 1996, vol. 1, No. 9, pp. 296-301, "Leaf methanol-the simplest natural product from plants".
Feagley, et al., Texas Agricultural Extension Service, Texas A & M University Digital Library, Publications, L-5212, Sep. 1998, pp. 1-4, XP055046729, "Using Soluble Calcium to Stimulate Plant Growth".
Ferguson, et al., PNAS, Jan. 9, 2007, vol. 104, No. 2, pp. 513-518, "Signal transduction pathway of TonB-dependent transporters".
Fishman, et al., Biomacro Molecules, 5(2), pp. 334-341, 1 pg. Abstract, Jan. 2004, "Nano Structure of Native Pectin Sugar Acid Gels Visualized by Atomic Force Microscopy".
Fishman, et al., J Agric Food Chem, Sep. 2001, 49(9): 4494-501, 1 pg. Abstract, "Solvent effects on the molecular properties of pectins".
Gerard, J. Phycol. 33, 800-810 (1997), "The Role of Nitrogen Nutrition in High-Temperature Tolerance of the Kelp, Laminaria Saccharina (Chromophyta)".
Gibson, Plant Physiology, Dec. 2000, vol. 124, pp. 1532-1539, "Plant Sugar-Response Pathways. Part of a Complex Regulatory Web".
Goldenkova, et al., Russian Journal of Plant Physiology, vol. 49, No. 4, 2002, pp. 524-529, "The Expression of the Bacterial Gene for Xylose (Glucose) Isomerase in Transgenic Tobacco Plants Affects Plant Morphology and Phytohormonal Balance".
Goubet, et al., Plant Physiol. (1998) 116: 337-347, "Identification and Partial Characterization of the Pectin Methyltransferase 'Homogalacturonan-Methyltransferase' from Membranes of Tobacco Cell Suspensions".
Gout, et al., Plant Physiology, May 2000, vol. 123, pp. 287-296, "Metabolism of Methanol in Plant Cells. Carbon-13 Nuclear Magnetic Resonance Studies".
Korean communication, with English translation, dated Mar. 16, 2018 in co-pending application No. 10-2014-7013877.
Notice of allowance dated Mar. 13, 2018 in co-pending U.S. Appl. No. 14/359,455.
Canadian communcation, dated Apr. 25, 2018 in co-pending Canadian patent application No. 2,856,580.
Korean communication, with English translation, dated Jun. 13, 2019 in co-pending Korean application No. 10-2019-7004673.
Mexican communication, with English translation, dated Jun. 5, 2019 in co-pending Mexican patent application No. MX/a/2017/008743.
Mexican communication, with English translation, dated Feb. 5, 2019 in co-pending Mexican patent application No. MX/a/2017/008743.
Advisory action dated Feb. 22, 2019 in co-pending U.S. Appl. No. 15/412,495.
Canadian communication dated May 7, 2019 in co-pending Canadian patent application No. 2,856,580.
Office action dated Apr. 15, 2019 in co-pending U.S. Appl. No. 15/412,495.
Brazilian communication, with English translation, dated Jun. 18, 2019 in co-pending Brazilian patent application No. BR112014012216-4.
Australian communication dated Aug. 5, 2019 in corresponding Australian patent application No. 2017255439.
Baker et al., "Calcium Peroxide as a Seed Coating Material for Padi Rice", Plant and Soil, vol. 99, pp. 357-363, 1987.
Hamilton et al., "A Library of Chemically Defined Human N-Glycans Synthesized from Microbial Oligosaccharide Precursors", Scientific Reports, 7: 15907, pp. 1-12, Nov. 2017.
Liu et al., "Increased Oxygen Bioavailability Improved Vigor and Germination of Aged Vegetable Seeds", HortScience, vol. 47, No. 12, pp. 1714-1721, Dec. 2012.
Notice of allowance dated Aug. 23, 2019 in co-pending U.S. Appl. No. 15/412,495.
Israel Communication, with English translation, dated Sep. 15, 2019 in corresponding Israeli patent application No. 262197.
Notice of allowance dated Oct. 9, 2019 in co-pending U.S. Appl. No. 15/412,495.
Eurasian communication, with English translation, dated Nov. 11, 2019 in corresponding Eurasian patent application No. 201892477.
Brazilian communcation, with English translation, dated Dec. 19, 2019 in co-pending Brazilian patent application No. BR112014012216-4.
Colombian communication, with English translation, dated Jan. 22, 2020 in corresponding Colombian patent application No. NC2018/0012502.
Chilean communcation, with English translation, dated Feb. 7, 2020 in corresponding Chilean patent application No. 201803067.
Japanese communcation, with English translation, dated Jun. 2, 2020 in co-pending Japanese patent application No. 2019-087912.
Indian communication dated Jun. 16, 2020 in corresponding Indian patent application No. 201817044473.
Eurasian communication dated Jun. 4, 2020 in corresponding Eurasian patent application No. 201892477.
Indian communication dated Jan. 10, 2020 in co-pending Indian patent application No. 3745/DELNP/2014.
Brazilian communication, with English translation, dated Dec. 6, 2019 in co-pending Brazilian patent application No. BR122019020690-2.
Israeli communication, with English translation, dated Feb. 19, 2020 in corresponding Israeli patent application No. 91224.
ARIPO communication dated Apr. 14, 2020 in corresponding ARIPO patent application No. AP/P/2018/011079.
Israel communication, with English translation, dated Jul. 23, 2020 in corresponding Israeli patent application No. 262197.
Office Action dated Aug. 31, 2020 in co-pending U.S. Appl. No. 16/000,926.
Chinese communication, with English translation, dated Sep. 4, 2020 in corresponding Chinese patent application No. 201780040199.2.
Huang et al., "Study on the Production of Invert Sugar by Acid Hydrolysis of Sucrose", Food Science, vol. 24, No. 3, pp. 24-26, 2003.
European communication dated Oct. 20, 2020 in corresponding European patent application No. 17790131.1.

(56) References Cited

OTHER PUBLICATIONS

"deglycosylation—definition and meaning", downloaded from https://www.wordnik.com/words/deglycosylation on Dec. 1, 2020.
Horiuchi et al., "Comparative Analysis of N-glycans in the Ungerminated and Germinated Stages of Oryza Sativa", Carbohydrate Research, vol. 418, pp. 1-8, Dec. 11, 2015.
Niedz et al., "Using Isothiazolone Biocides to Control Microbial and Fungal Contaminants in Plant Tissue Cultures", Horttechnology, vol. 8, Iss. 4, pp. 598-601, Oct.-Dec. 1998.
Final rejection dated Dec. 2, 2020 in co-pending U.S. Appl. No. 16/000,926.
Office action dated Dec. 2, 2020 in co-pending U.S. Appl. No. 16/666,466.
Japanese communication, with English translation, dated Feb. 24, 2021 in co-pending Japanese patent application No. 2019-087912.
Israel communication, with English translation, dated Feb. 16, 2021 in corresponding Israeli patent application No. 95917.
Notice of allowance dated Mar. 19, 2021 in co-pending U.S. Appl. No. 16/000,926.
Final rejection dated Mar. 9, 2021 in co-pending U.S. Appl. No. 16/666,466.
Castilho et al., "N-Glycosylation Engineering of Plants for the Biosynthesis of Glycoproteins with Bisected and Branched Complex N-Glycans", vol. 21, No. 6, pp. 813-823, 2011.
Eurasian communication, with English translation, dated Nov. 6, 2020 in corresponding Eurasian patent application No. 201892477.
Israeli communication, with English translation, dated Sep. 23, 2020 in corresponding Israeli patent application No. 272251.
Colombian communication, with English translation, dated Nov. 23, 2020 in corresponding Colombian patent application No. NC2018/0012502.
Japanese communication, with English translation, dated Dec. 1, 2020 in corresponding Japanese patent application No. 2018-556340.
Mexican communication dated Oct. 19, 2019 in corresponding European patent appliation No. MX/a/2017/008743.
European communication dated Sep. 23, 2019 in corresponding European patent application No. 17790131.1.
European communication dated Oct. 10, 2019 in corresponding European patent application No. 17790131.1.
Harvey, "Ionization and Collision-induced Fragmentation of N-linked and Related Carbohydrates Using Divalent Cations", Journal of the American Society for Mass Spectrometry, Elsevier Science Inc, vol. 12, No. 8, Aug. 1, 2001, pp. 026-037.
Nonomura et al., "The Path of Carbon in Photosyntehsis. XXXI. The Role of Lectins", Journal of Plant Nutrition, vol. 37, No. 6, Apr. 1, 2014, pp. 785-794.

* cited by examiner

//FORMULATIONS AND METHODS FOR TREATING PHOTOSYNTHETIC ORGANISMS AND ENHANCING QUALITIES AND QUANTITIES OF YIELDS WITH GLYCAN COMPOSITE FORMULATIONS

CROSS-REFERENCE

This application claims priority of Provisional Application Ser. No. 62/329,226 filed Apr. 29, 2016, the disclosure of which is incorporated herein by reference.

FIELD

Embodiments disclosed herein relate to methods for treating photosynthetic organisms, such as fields of photosynthetic organisms, including farm crops, and/or enhancing their growth with formulations that comprise compositions of glycan composites comprising branched glycan deglycosylate components with coordination complex components. Moreover, in liquid compositions of matter, the foregoing formulations may include one or more preservatives, rendering the formulations suitable to ship and store. Embodiments disclosed herein include systems for delivery of glycan composites into photosynthetic organisms.

BACKGROUND

Embodiments disclosed herein relate to the application to photosynthetic organisms of glycan composite formulations comprised of one or more branched glycan deglycosylates and transition metal$^{2+}$ coordination complexes.

The health of photosynthetic organisms in agricultural crops is dependent on their biological manufacture of photosynthates, especially, sugars; and compositions of the present embodiments enhance the availability of these photosynthates to promote crop health and growth. Recent major advancements for crop improvements include water-soluble glucosides as described in the patent literature. While these glucosides have proven effective at foliar rates ranging in the application of kilograms per hectare, there is a need for formulations that are more potent and effective in the range of grams per hectare as shown in the embodiments herein. The branched glycan deglycosylates of the present embodiments are of higher order potencies than conventional compositions while transition metal$^{2+}$ coordination complex components of the glycan composites further improve activity. In addition, by treatment of sap nectar, glycan composites improve photosynthate flux capacity of a crop. Further still, methods and compositions of glycan composites may be customized for improvement of qualities and/or quantities of crops while sustaining potency of the glycan composite.

SUMMARY

It is an object of embodiments disclosed herein to provide methods and formulations for treating photosynthetic organisms and enhancing qualities and quantities of crop yields. The formulations comprise one or more branched glycan deglycosylates combined with transition metal$^{2+}$ coordination complexes, thereby forming a glycan composite. Embodiments provide methods and compositions for the formulation of glycan composites.

It is a further object of embodiments disclosed herein to provide liquid formulations comprising one or more formulations of glycan composites with preservatives for retention of high potency.

It is a further object of embodiments disclosed herein to provide methods and formulations for treating photosynthetic organisms such as plants, and for enhancing photosynthetic organismal growth, such as in plant crops, by applying a glycan composite formulation.

It is another object of embodiments disclosed herein to provide glycan composite formulations comprising metals$^{2+}$ components of transition metal coordination complexes and providing anionic components of transition metal$^{2+}$ coordination complexes.

It is a further object of embodiments disclosed herein to provide glycan composite formulations comprising soluble transition metals$^{2+}$ preferably in coordination complexes.

It is a further object of embodiments disclosed herein to provide glycan composite formulations comprising one or more anionic components of the transition metal$^{2+}$ coordination complexes.

It is a further object of embodiments disclosed herein to provide glycan composite formulations comprising one or more anionic components of the transition metal$^{2+}$ coordination complexes, wherein the anionic component is selected from polydentate sequestering agents.

It is a further object of embodiments disclosed herein to provide a method for formulating a glycan composite composition that comprises one or more preservative components that maintains active liquid solutions through periods of shipping and storage.

It is a further object to provide methods for treatment of photosynthetic organisms, particularly plants, and growth formulations for photosynthetic organisms comprising glycan composite formulations rendered as liquid and/or dry packages that are available and penetrative consistent with facilitation of transcuticular, transepidermal and/or transmembrane transport; seed, foliar and root uptake of solutes; germination; and/or that maintain growth in low light intensity environments.

It is a further object to provide treatment and growth formulations for photosynthetic organisms and to their parts; and particularly applied to agricultural crops.

It is a further object to provide a plant seed treatment formulation comprising glycan composite compositions and methods for management of growth in green plants, particularly where applied to seeds to hasten germination and growth.

It is a further object to provide floral and/or fruit treatment formulations comprising glycan composite compositions for management of quality growth in photosynthetic organisms; particularly where applied to roots, foliage, flowers and/or fruit while attached to the plant before harvest; to detached flowers and/or fruit after harvest; and/or to improve flavor qualities.

It is another object to provide glycan composite compositions of matter.

It is another object to provide glycan composites comprised of branched glycan deglycosylates and soluble transition metals$^{2+}$.

It is another object to provide glycan composites, comprised of branched glycan deglycosylates obtained from natural products.

It is another object to provide a glycan composite and/or its components as novel plant growth regulators selected to increase crop quantity and quality.

It is another object to provide novel glycan composite plant growth regulators for the management of respiration in photosynthetic organisms.

It is yet another object to provide a glycan composite environment in the presence of photosynthetic organisms under cultivation conducive of respiration in low light intensity shaded to dark conditions.

It is another object to provide an environment of respiratory acceleration in the presence of photosynthetic organisms under cultivation by treatments with glycan composites. In some embodiments, roots at any time of day or night, and/or shoots in the dark of night, are exposed to respiration accelerators that elevate ambient oxygen ($O_2$) either through >25% $O_2$ gas treatment of a photosynthetic organism, or by application of $O_2$-generators. Furthermore, another object is to provide an environment conducive to respiration in the presence of the photosynthetic organisms under cultivation by treatments with glycan composites; wherein photosynthetic organisms under cultivation by treatments with glycan composites may be exposed to respiration accelerators.

It is yet another object to provide an environment conducive to the accumulation of photosynthates in the presence of photosynthetic organisms under cultivation by treatments with glycan composites. Photosynthetic organisms under cultivation by treatments with glycan composites may be exposed to respiration decelerators conducive to the accumulation of photosynthates.

It is another object to provide glycan composites and/or their components as natural product biostimulants selected to benefit nutrient use efficiency, improve tolerance to abiotic stress, and/or increase crop quantity and quality.

It is another object to provide glycan composite treatments for photosynthetic growth, comprising branched glycan deglycosylates and transition metal$^{2+}$ coordination complexes. In certain embodiments, such as for convenient utilization in the field, the complex is rendered convenient to apply to photosynthetic organisms and readily safe for photosynthetic organisms by formulation in liquid and/or dry packages and with the option for admixture of crop treatments.

It is a further object to provide treatment methods and compositions for photosynthetic organisms comprising exogenous glycan composite compositions for control of the endogenous deconjugation of photosynthates that advance the quality and quantity of commercial harvests.

It is a further object to provide a treatment and growth formulation for photosynthetic organisms comprising exogenous glycan composite compositions for treatment of endogenous photosynthates that enhance the flavor qualities of commercial yields.

It is a further object to provide a treatment and growth formulation for photosynthetic organisms comprising glycan composite compositions that are preserved for storage with one or more phytobland preservatives.

It is a further object to provide a treatment and growth formulation for photosynthetic organisms comprising glycan composite systems for the improvement of crop growth in water culture.

It is a further object to provide a treatment and growth formulation for photosynthetic organisms comprising glycan composites as synergistic systems for improving crop aesthetic quality by reduction of the incidence of sun scorch.

It is a further object to provide a method for treatment of photosynthetic organisms that fortifies the nutritional qualities of sap nectar of flowering plant fields comprising applying glycan composites to flowering food plants for the vigorous health benefit of pollinators and grazers.

In certain embodiments, a glycan composite is formulated as a complex comprised of one or more methyl-α-D-Mannopyranosyl (Man)$_{1-3}$ components and one or more citrate-$Ca^{2+}$-$Mn^{2+}$-coordination complex components and optionally with one or more D-block transition metals$^{2+}$; and/or further formulated with one or more optional preservatives.

In certain embodiments, a glycan composite is formulated as a complex comprised of one or more methyl-α-D-Man$_{1-3}$ components and one or more malate-$Ca^{2+}$-$Mn^{2+}$-coordination complex components and optionally with one or more D-block transition metals$^{2+}$; and/or formulated with one or more optional preservatives.

In certain embodiments, a glycan composite is formulated as a complex comprised of one or more methyl-α-D-Man$_{1-3}$ components and one or more glutarate-$Ca^{2+}$-$Mn^{2+}$-coordination complex components; and optionally with one or more D-block transition metals$^{2+}$; and/or further with one or more optional preservatives.

In certain embodiments, a glycan composite is formulated as a complex comprised of one or more methyl-α-D-Man$_{1-3}$ components and one or more succinate-$Ca^{2+}$-$Mn^{2+}$-coordination complex components and optionally with one or more D-block transition metals$^{2+}$; and/or further with one or more optional preservatives.

In certain embodiments, a glycan composite is formulated as a complex comprised of one or more Man$_{1-3}$N-linked-glycan components; one or more $Ca^{2+}$-$Mn^{2+}$-citrate coordination complex components; and optionally with one or more D-block transition metals$^{2+}$; and/or further with one or more optional preservatives.

In certain embodiments, a glycan composite is formulated as a complex comprised of one or more Man$_{1-3}$N-linked-glycan components; one or more $Ca^{2+}$-$Mn^{2+}$-coordination complex components; optionally with one or more D-block transition metals$^{2+}$; and/or further with one or more optional preservatives In certain embodiments, a glycan composite is formulated as a complex comprised of one or more methyl-α-D-Glc$_1$ components; one or more citrate $Ca^{2+}$-$Mn^{2+}$-coordination complex components; optionally with one or more D-block transition metals$^{2+}$; and/or further with one or more optional preservatives.

In certain embodiments, a glycan composite is formulated as a complex comprised of one or more deglycosylated glycan components; $Ca^{2+}$-$Mn^{2+}$-coordination complex components; optionally with one or more D-block transition metals$^{2+}$; and/or further with one or more optional preservatives.

In certain embodiments, a glycan composite is formulated as a complex comprised of one or more deglycosylated O-linked-glycan components from botanical gums; $Ca^{2+}$-$Mn^{2+}$-coordination complex components; optionally with one or more D-block transition metals$^{2+}$; and/or further with one or more optional preservatives.

In certain embodiments, a glycan composite is formulated as a complex comprised of one or more deglycosylated N-linked-glycan components from invertase; $Ca^{2+}$-$Mn^{2+}$-coordination complex components; optionally with one or more D-block transition metals$^{2+}$; and/or further with one or more optional preservatives.

DETAILED DESCRIPTION

Figure 1:
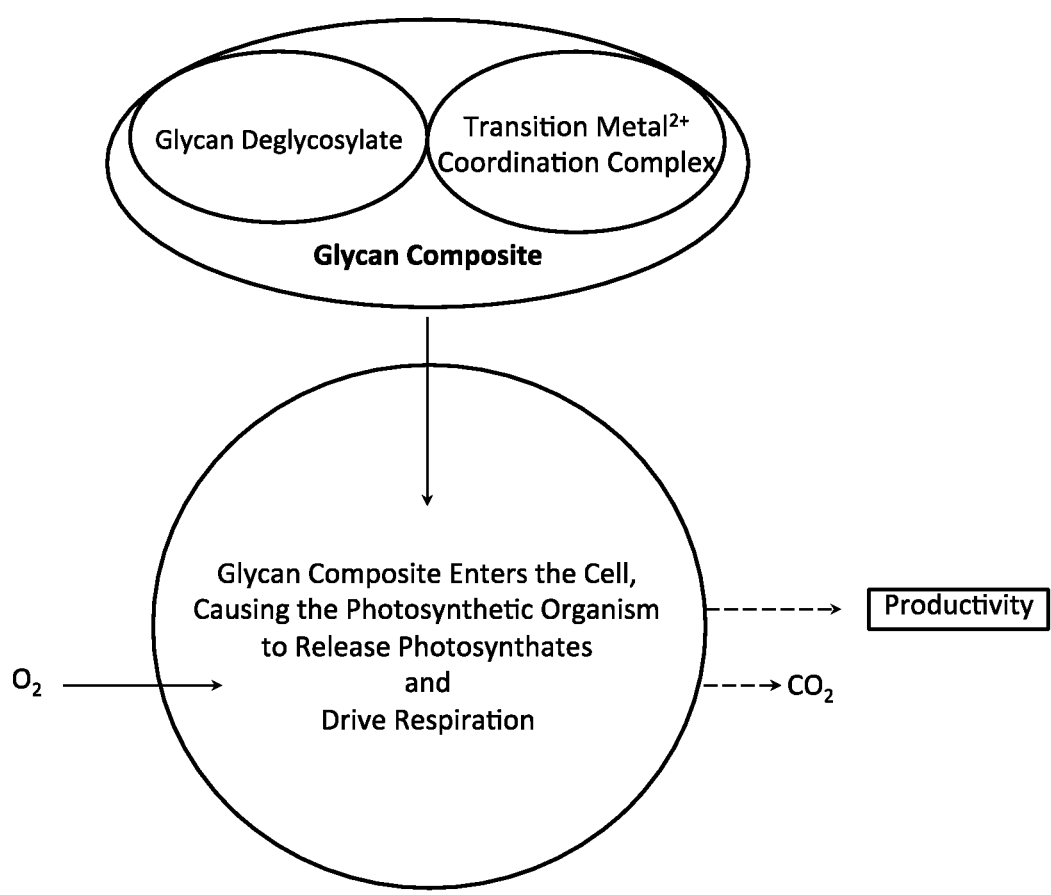
FIG. 1 is a schematic representation of the flow of processes from top to bottom resulting in methods and compositions for the treatment of photosynthetic organisms with the glycan composite, in accordance with certain embodiments. In the example of FIG. 1, the application of a glycan composite exposes a plant cell to a solution that enhances qualities and quantities of crops. The glycan composite is transported into the cell; metabolized; and energy is transferred. This metabolic pathway, defined by the glycan composite routing photosynthates out of storage and into respiration of $O_2 \rightarrow CO_2$, led to heightened plant productivity for enhanced quality and yield.

Unless otherwise defined, all technical and scientific terms employed herein have their conventional meaning in the art. As used herein, the following terms have the meanings ascribed.

"M" refers to molar concentration, "µM" refers to microMolar, and "mM" refers to milliMolar concentration.

"kD" refers to kiloDalton

"PGR" refers to a plant growth regulator.

"Percent" or "%" is percent by weight unless otherwise indicated.

"Ppb" refers to parts per billion by weight.

"Ppm" refers to parts per million by weight.

"Ppt" refers to parts per thousand by weight.

Nomenclature—Botanical names generally are given as common names that are referable to scientific nomenclature through abundant scholarly resources.

Statistics—Comparison of means by T-test (two-tailed) show significance at $p \leq 0.05$.

"Enhance growth" or "enhancing growth" refers to promoting, increasing or improving the rate of growth of a photosynthetic organism such as a plant; and/or increasing or promoting an increase in the size and/or yield; and/or enhancing the quality of the photosynthetic organism or its parts; regulating the flow of photosynthates; enhancing the flow of photosynthates to respiration; enhancing aesthetics; increasing hydrostatic pressure; improving fragrance; accumulating photosynthates within the photosynthetic organism; and/or improving the flavor of the photosynthetic organism, in particular, Brix (a measure of sugar content), of its seed, fruit, flower, nectar, root, stem, or its parts.

"Photosynthetic Organism" refers to life forms that synthesize photosynthates including $C_3$, $C_4$, and CAM plants; and photosynthetic Eukaryotes including, but not necessarily limited to, those of the following preferred supergroups: Archaeplastida such as Plantae, Chlorophyta and Rhodophyta; and Chromoveolata such as Phaeophyta. Photosynthetic organisms may also refer to botanicals; turf and ornamentals; crops, including food, fodder, fiber, feed, and agricultural crops; and harvests thereof; and plants, both higher and lower plants, and plant-like organisms. The systems, methods and formulations may be advantageously used with any species of photosynthetic life.

The compositions may be applied to virtually any variety of live photosynthetic organisms. Photosynthetic organisms which may benefit include, but are not limited to, all Plantae particularly those in all crop groups recognized by the United States Environmental Protection Agency (2012: 40 CFR 180.41) as for example such as the following: alfalfa, allspice, amaranth, angelica, anise, annatto, arugula, bach ciao, balm, barley, basil, bean, beet, borage, breadfruit, broccoli, Brussels sprouts, burdock, burnet, cabbage, cantaloupe, caper, caraway, cardamom, cardoon, carrot, cassava, castor, cauliflower, cavalo, broccolo, celeriac, celery, celtuce, cereals, chard, chayote, chervil, chickpea, chicory, chive, cilantro, cinnamon, clove, clover, coffee, collards, coriander, corn, cotton, cranberry, cress, cucumber, cumin, curry, daikon, daylily, dill, endive, euphorbia, eggplant, fennel, fenugreek, flax, forage, fritillaria, gherkin, gourd, grape, grain, garlic, guar, hay, hemp, horehound, hosta, hyssop, jackbean, jicama, jojoba, kale, kohlrabi, kudzu, kurrat, lablab bean, lavender, leafy greens, leek, legume, lemongrass, lentil, lespedeza, lettuce, lupin, mace, marjoram, melon, millet, mint, mizuna, *Momordica*, muskmelon, mustard, nasturtium, nutmeg, oat, onion, orach, parsley, parsnip, pasture, pea, peanut, pepper, peppermint, perilla, popcorn, potato, poppy, pumpkin, purslane, radicchio, radish, rape greens, rhubarb, rice, rosemary, rutabaga, rye, safflower, saffron, sage, sainfoin, salsify, skirret, sesame, shallot, sorghum, soybean, spinach, squash, stevia, strawberry, sunflower, sweet bay, sweet potato, sugar beet, sugar cane, Swiss chard, swordbean, tanier, taro, tarragon, tea, teosinte, thyme, tobacco, tomato, trefoil, triticale, turmeric, turnip, vanilla, vernonia, vetch, watermelon, wheat, wild rice, wintergreen, woodruff, wormwood, yam, zucchini and the like; fruit-bearing plants, such as, almond, apple, apricot, avocado, azarole, banana, beech nut, blackberry, blueberry, Brazil nut, breadfruit, butternut, cashew, cherry, chestnut, chinquapin, citrus, cocoa, cocona, coffee, currant, dragonfruit, elderberry, fig, filbert, goji, gooseberry, grapefruit, guava, hickory nut, huckleberry, kiwifruit, kumquat, lemon, lime, loganberry, loquat, macadamia nut, mango, mangosteen, martynia, mayhaw, naranjilla, nectarine, nopales, nut, okra, olive, orange, papaya, passion fruit, peach, pear, pecan, pepper, pistachio, plum, plumcot, prune, pummelo, quince, raspberry, roselle, tangelo, tangerine, tangor, tejocote, tomatillo, uniq fruit, walnut, spices, and the like; florals and ornamentals, such as achillea, adenium, agave, ageratum, aloe, alyssum, anemone, aquilegia, aster, azalea, begonia, bird-of-paradise, bleeding heart, borage, bromeliad, bougainvillea, buddlea, cactus, calendula, camellia, campanula, carex, carnation, celosia, chrysanthemum, clematis, cleome, coleus, cosmos, crocus, croton, cyclamen, dahlia, daffodil, daisy, dandelion, day lily, delphinium, dianthus, dietes, digitalis, dipladenia, dock, dusty miller, euonymus, forget-me-not, fremontia, fuchsia, gardenia, gazania, geranium, gerbera, gesneriad, gladiolus, hibiscus, hydrangea, impatiens, jasmine, lily, lilac, lisianthus, lobelia, marigold, mesembryanthemum, mimulus, myosotis, narcissus, New Guinea Impatiens, nymphaea, oenothera, oleander, orchid, ornamentals, oxalis, pansy, penstemon, peony, petunia, *plumeria*, poinsettia, polemonium, polygonum, poppy, portulaca, primula, ranunculus, rhododendron, rose, salvia, senecio, shooting star, snapdragon, solanum, solidago, stock, ti, torenia, tulip, verbena, vinca, viola, violet, yucca, zinnia, and the like; indoor garden and houseplants, such as African violet, Chinese evergreen, succulents, dieffenbachia, dracaena, ficus, hosta, peace lily, philodendron, pothos, rubber tree, sansevieria, chlorophytum, and the like; trees, such as Abies, Aspen, birch, cedar, *Cinnamomum, Cornus,* cycad, cypress, Dawn Redwood, elm, ficus, fir, ginkgo, gymnosperm, hardwood trees, Indian Rosewood, jacaranda, juniper, Laurel, legume, *Liriodendron*, magnolia, mahogany, maple, oak, palm, *Picea, Pinus, Pittosporum, Plantago,* poplar, redwood, rosewood, saguaro, Salix, sycamore, *Taxus*, teak, willow, yew, Christmas tree, sources of lumber, sources of paper, and the like; grasses, such as turf, sod, bluegrass, bent grass, Bermuda grass, bromegrass, calamogrostis, carex, creeping bent, elymus, fescue, festuca, helictotrichon, imperata, miscanthus, molina, panicum, paspalum, pennisetum, phalaris, poa, grass seeds, and the like; dwarfs; grafts; cuttings; hybrids; and the like. In addition to the aforementioned crops, the formulations are also suitable for application to photosynthetic organismal sources of secondary metabolites such as switchgrass, jatropha, euphorbia, nicotiana, lichen, kelp, diatom, cyanobacteria, bacteria, dunaliella, nannochloropsis, chlorella, haematococcus, eucheuma; bryophytes such as moss and fern; and the like. This list is intended to be exemplary and is not intended to be exclusive. Other photosynthetic organisms that may benefit by application of the compositions and methods of the present embodiments will be readily determined by those skilled in the art. The methods and formulations disclosed herein may be used to enhance growth in juvenile and mature photosynthetic organisms, as well as cuttings, tissues, seeds, meristems, callus, cells, and micropropagation. Seed priming and coatings prior to sowing may be applied in the range of 10-1000 μg of glycan composites per seed, preferably in the range of 20-300 μg/seed.

Alternatively, seeds, corms, bulbs, stolons, and cuttings, may be treated in-furrow, simultaneously with sowing. Generally, the anatomical location to which the composition of the method is applied should have a surface area large enough to enable the photosynthetic organism to absorb the composition. For example, it is desirable to include the sprouted cotyledon (i.e., the "seed leaf"), potato stolon, bulb, corm, or other substantial surfaces that facilitate absorption, such as true leaves and roots. Fruit bearing plants may be treated before and after the onset of bud, fruit and seed formation. For plants such as annuals, perennials, trees, orchids, gesneriads, and cacti in which stems, roots and/or trunks may be treated, application methods include treatment of shoots with sprays and/or treatment of shoots and roots by sprench or dip application or by separate root and shoot applications. Commercial aqua- and mariculture crops such as spirulina, aonori, laver, kombu, macrocystis, nori and wakame, may be misted, sprayed, brushed or dipped in sterile aqueous freshwater or seawater solutions of 10 ppb-3% glycan composites, allowing 15-90 minutes to absorb.

The Glycan Composite

The methods and formulations in accordance with certain embodiments disclosed herein are designed, for example, to treat any of the aforementioned photosynthetic organisms such as plants, and to enhance quality, increase growth and/or improve the quality and quantity of harvested yields. This can be achieved by applying glycan composite formulations comprised of the following: one or more branched glycan deglycosylates with certain transition metal$^{2+}$ coordination complexes. The formulations can be applied in a dry or liquid form directly to photosynthetic organisms. In certain embodiments, liquid formulations additionally may include a preservative for prevention of spoilage during shipping and storage periods. The methods disclosed herein make glycan composites readily available for uptake by photosynthetic organisms.

The Branched Glycan Deglycosylate Component

Certain embodiments disclosed herein provide branched glycan deglycosylates that are components of the glycan composite.

Hereinafter, this branched glycan deglycosylate component will be referred to as the "glycan" or "deglycosylate" component of the glycan composite.

Glycans are rather expensive when chemically synthesized and, if not for certain of the embodiments of the invention, agricultural applications would not be economically justifiable. Fortunately, embodiments disclosed herein provide a number of cost-effective products by means of deglycosylation of certain inexpensive macromolecules, and these products make suitable glycan components of the glycan composite. Thus, certain branched glycan deglycosylates render economically feasible farm crop treatments. Suitable glycans may originate by cleavage, i.e., deglycosylation of glycan subunits from their parent macromolecule. Generally, macromolecules greater than 1000s kD are chemical structures too large for treatment and uptake by a photosynthetic organism; therefore, deglycosylates less than 10s kD are preferred branched glycan deglycosylate components. Deglycosylates are typically from macromolecules such as proteins, glycoproteins, N-linked-glycan-macromolecules and/or O-linked-glycan-macromolecules. They may be products of hydrolysis or other processes known to the art, resulting from actions of acids, bases, enzymes and/or microbes breaking bonds. Biosynthesis of branched glycan components by a plant or yeast may be cost effective as compared to products of chemical synthesis and purification, the expense of which has proven prohibitive. For example, purchase of pure high mannan branched N-linked glycans may cost $1000s/gram; whereas, suitable high mannan branched N-linked glycans, deglycosylated from proteins per embodiments disclosed herein, may cost pennies/gram.

Botanical sources of suitable glycan subunits include the following: *Cyanaposis tetragonalobus* and *Cyanaposis psoraloides*, guar gums, GalMan$_2$; *Caesalpinia spinosa*, tara gums, GalMan$_3$; *Ceratonia siliqua*, locust bean gums, GalMan$_{1-8}$; *Amorphophallus konjac*, konjac gums, Glc$_2$Man$_2$; *Canavalia ensiformis* Jack Bean, N-linked glycans; Ivory nut, Man$_n$; carob; coffee bean; fenugreek; barley; palms, lilies, irises, and legumes, endosperm tissues, Man$_n$; soft wood and bark of various trees; birch; gymnosperms; Norway spruce; and Chlorophyta such as Dasycladales, Characeae, *Codium fragile, Caulerpa* and *Acetabularia acetabulum* Mannan Weed. Furthermore, branched mannan derivative structures such as exhibited in FIG. 2, may be found in fungi, such as, *Hansenula holstii, Rhodotorula acheniorum*; in glycoproteins, such as, concanavalins and enzymes; and preferably in invertases. Other natural sources include microbes; bacteria; mushrooms; animals, such as, arthropods, crustaceans, shellfish, fish, krill, and insects; and waste, such as guano, offal, blood, marrow, liver, animal organ, bark, sawdust, wood, bone, exoskeleton, ferment, bycatch, and manure.

The aforementioned gums, proteins and other macromolecules may undergo deglycosylation by commercial processes known in the art. For example, some branched glycan macromolecules may be microbially digested under tightly controlled fermentation and others may be subjected to various other enzymatic digestion processes known in the art; and whereby, branched glycan macromolecules may be partially hydrolyzed by cleaving >100,000 kD gums to average molecular weights of 0.2-10 kDa glycan deglycosylates. That permits uptake of the smaller deglycosylates by plants. By comparison with a variety of natural sources, branched glycan deglycosylates from invertases showed the highest feasibility, exhibiting low cost and high potency, making them suitable for commercial production; see Table 1.

TABLE 1

Comparisons of natural sources for branched glycan deglycosylates. Relative potencies and costs after manufacturing of the finished products from various sources were compared. In most cases, higher potency translated to lower cost. Invertase was the source of the least cost and highest potency glycan deglycosylates suitable for production.

| Source | Potency | Relative Cost |
|---|---|---|
| Invertase | 1000-1,000,000 | $ |
| Botanical Gums | 10-100 | $$$ |
| Shellfish | 5-10 | $$$$ |
| Sawdust | 1 | $$$$ |

Terminal ligands of glycans were key to their activity, rendering identification of this part of glycan structure critical. Suitable terminal ligands of a glycan were identified in glycopyranoses, such as, galactopyranoses, glucopyranoses, and preferably mannopyranoses; alkyl-, acyl-, and aryl-substitutions thereof; and acylglycosamines. It followed that suitable glycans were cationic, anionic and neutral polymers; aldosyls and/or ketosyls; and branched glycans with any of the above terminal ligands. The molecular weight sizes typically ranged from 0.1 to >500 kD, preferably between 0.2 to 10 kD, and most preferably in the range of 0.5 to 2 kD.

Glycan abbreviations are as follow:
Gal means galactopyranosyl;
Glc means glucopyranosyl;
GlcNAc means N-acetylglucosaminosyl;
GalNAc means N-acetylgalactosaminosyl;
Gly means glycopyranosyl;
Lac means lactosyl;
Ara means arabinosyl;
Man means mannopyranosyl; and
$Man_n$ means poly-Man.

j, m, n subscripts mean corresponding chainlengths, where m=1-24 and n=1-24, unless otherwise noted. For example, $GalGlcMan_n$ means GalactopyranosylGlucopyranosylMannopyranosyl$_n$ and $Glc_mMan_n$ means Glucopyranosyl$_m$Mannopyranosyl$_n$.

Hyphenated numerals denote the range of sizes. For example, $Man_{8-14}GlcNAc_{1-2}$ means the branched mannopyranosyl$_{8-14}$N-acetylglucosamine$_{1-2}$ in which $Man_{8-14}$ means a range of 8 to 14 Man units in the branched chain.

EXAMPLEs of preferred branched chains include $Man_n$Gly with alkyl, acyl, aryl, polyacyl, polyalkyl, amine or no substitutions; aldosyls; ketosyls; $GlcNAc_n$; alkylGlc$_n$; methylGlc$_n$; methylGlcGly$_n$; alkylMan$_n$; $Gal_nMan_2$; pentoses; arabinoses; riboses; xyloses; hexoses; mannoses, mannosides, mannans; glucoses, glucosides, glucans; galactoses, galactosides, galactans; raffinoses; $Gly_2$, for example, $Glc_2$ sucroses, trehaloses, maltoses, gentiobioses, cellobioses, GalGlc lactoses, xylobioses, laminaribioses; $Gal_mMan_n$; $Gal_mGlc_jMan_n$; $Glc_jMan_n$; $XyloMan_n$; $AraMan_n$; $AraGal_n$; fructofuranosyl$_m$Glc$_j$; Lac; Maltopyranosyls; $Man_{1-3}$, such as, $Man_1$, methyl-α-D-Man, methyl-α-D-Man$_{1-3}$, methyl-α-D-Man$_3$Gal; triosyls, such as, $Man_3$; and derivatives and combinations thereof.

Suitable glycans in a blend of deglycosylates of the glycan composite are, for example, $Man_1$, $Man_3$, methyl-D-Man$_n$ and methyl-D-Glc$_n$. Glycan deglycosylates may be selected from short chains, such as, $Man_n$, where n is from 1 to 8, preferably $Man_{1-3}$; O-linked-branched-chains, such as, $Man_{m-n}$Gly, $Man_{m-n}$Glc, $Man_{m-n}$Gal, and $Man_{m-n}$GalGlc, where m is from 1-8 and n is from 1-8. Yet other suitable glycans are >1 kDa chains; such as, for example, $Gal_mMan_n$; $Gal_nMan_n$; $Glc_mMan_n$; $Gal_jGlc_mMan_n$, j=1-24, m=1-24, n=1-24; deglycosylates are preferred <1 kDa where j=1-8, m=1-8, n=1-8, such as, for example, $Gal_2Man_2$; and in combinations and blends. Preferred glycan deglycosylates are O-linked glycans and N-linked glycans with $Gly_{m-n}$ where m=1-8 and n=1-8. Further examples include the following $Man_n$ core structures such as α-mannobioses, mannotetraoses, mannopentaoses; amino-functionalized-mannoses, for example, glycylMan$_n$, alanylMan$_n$, and aminylMan$_n$, where n=1-24.

Preferred branched glycan deglycosylates may comprise one or more N-linked-glycans such as for example $Man_nGlcNAc_{1-3}$ and $Man_{m-n}GlyNAc_{1-3}$, for example, $Man_{8-15}GlcNAc_2$. Preferred N-linked-glycans are selected from low molecular weight $Man_n$N-glycans, therefore, $Man_3GlcNAc_{1-3}$ and trimannopyranosyl-N-glycans are most highly preferred. Suitable derivatives may have higher orders of branching, such as, $Man_{m-n}nGalNAc_{1-3}$ for example, $Man_{8-15}GlcNAc_{1-2}$ and $Man_{9-20}GlcNAc_{1-3}$; and derivatives, such as, N-glycan, acyl, alkyl, and aryl-substitutions. Furthermore, suitable branched GalGlcManN-glycans include Glc:Gal:Man in ratios between 1:2:16-9:2:20; as, for example, $Gal_4Man_{10}GlcNAc_2$. In addition, N-acetylglycosaminyl-terminal ligands such as, N-acetylgalactosamines, N-acetylglucosamines, and N-acetylneuramines, may be selected from $GalNAc_{1-3}$; $GlcNAc_{1-3}$; $GlcNAc_2$; $Man_{1-8}GlcNAc_{1-3}$; derivatives and combinations, thereof.

Transition Metal$^{2+}$ Coordination Complex Components

Embodiments disclosed herein provide transition metal$^{2+}$ coordination complex compositions of the glycan composite. In certain embodiments, the transition metal$^{2+}$ coordination complex is comprised of the metals$^{2+}$ component and one or more anionic components. Specific metals$^{2+}$ are incorporated into the holoprotein structure for proper binding of glycans. In the absence of specific metals$^{2+}$, the protein structure is incomplete, lacking the conformation to conjugate. Therefore, these preferred metals$^{2+}$ include calcium ($Ca^{2+}$) and manganese ($Mn^{2+}$), and both applied together are preferred because $Ca^{2+}$ and $Mn^{2+}$ naturally occur in holoprotein binding sites. However, suitable transition metals$^{2+}$ other than $Mn^{2+}$ may be added, substituted or formulated including one or more D-block transition metals$^{2+}$ selected from cobalt ($Co^{2+}$), nickel ($Ni^{2+}$), and zinc ($Zn^{2+}$); and combinations thereof; and always in the presence of $Ca^{2+}$. In addition, the presence of iron ($Fe^{2+}$) and magnesium ($Mg^{2+}$) and/or one or more of the aforementioned D-block transition metals$^{2+}$ may further support the structural conformation of the holoprotein by $Ca^{2+}$ and $Mn^{2+}$. These metals$^{2+}$ and/or their water-soluble salts may be measured into the glycan composite as liquids or solids; for example, applied in the ranges of 0.1-100 ppm $Ca^{2+}$, 0.1-100 ppm $Mg^{2+}$, 0.1-10 ppm $Fe^{2+}$, 0.1-10 ppm $Mn^{2+}$, 0.1-10 ppm $Zn^{2+}$, 0.001-1 ppb $Co^{2+}$, and 0.001-0.1 ppb $Ni^{2+}$.

Preferred anionic components of the aforementioned transition metal$^{2+}$ coordination complexes of glycan composites may be selected from sequestering anions that further function as respiration accelerators, as follow: oxaloacetates; acetates; aconitates; citrates, isocitrates; fumarates; glutarates, ketoglutarates; malates; and succinates. Suitable acid derivatives thereof, named herein without exclusion of others, were selected from aconitic, citric, fumaric, glutaric, malic, oxaloacetic, succinic, and like acids of transition metal$^{2+}$ coordination complexes; and preferably at 10:1 anion:cation molar ratios or greater, within the range of 100 ppb to 30% w/w. Aconitic acids include aconitates, cis- and trans-aconitic acids, salts, and the like. Citric acids include citrates, citric, isocitric, and methylcitric acids; citric acid anhydrides; citric phosphates; salts, and the like. Fumaric acids include fumarates, fumaric acids, boletic acids, alkylfumarates, salts and the like. Glutaric acids include glutarates, ketoglutarates, glutaric acid, glutaric anhydride, alkylglutarates, glutamates, salts, and the like. Malic acids include malates, malic acids, maleic acids, maleates, maleic anhydrides, alkylmaleic anhydrides, maleyl-proteins, salts, and the like. Oxaloacetic acids include acetates, acetic acids such as glacial acetic acid and vinegar; acetyl-CoA; acetylphosphate, acetic anhydrides; alkylacetates, alkylacetoacetates, oxaloacetates, salts, and so forth. Succinic acids include succinates, succinic acids, Sprit of Amber, alkylsuccinic acids, succinyl anhydride, salts, and the like. The aforementioned salts include, one or more of Ca, Mg, Na, and transition metal$^{2+}$ coordination complexes with the aforementioned acids. Anionic components of transition metal$^{2+}$ coordination complexes may be preferably selected from their phosphates, such as, for example, malate-phosphate, citrate-phosphate, and the like. Generally, pure components of transition metal$^{2+}$ coordination complexes are commercially available in bulk. Anionic components of transition metal$^{2+}$ coordination complexes may be selected from suitable polydentate chelants, such as alkylamide chelants as follow: ammonium, sodium, and/or potassium salts of alkyl amide chelants such as, ethylene diaminetetraacetic acids (EDTA), N-hydroxyethylethylenediaminetriacetic acids (HeEDTA), ethylenediamine-N,N'-bis2-hydroxyphenylacetic acids (EDDHA), di(ortho-hydroxybenzyl)-ethylenediaminediacetic acids (HBED), diethylenetriaminepentaacetic acids (DTPA); methylglycine N,N-diacetic acids (MGDA); glutamic acid diacetic acids (GLDA); and the like. The anionic components are conventionally added to liquid solutions of the metals at a minimum of 7:1, and preferably at 10:1 anion:cation molar ratios or greater.

Preferred salts of the transition metal$^{2+}$ coordination complexes may result from reacting metal$^{2+}$ and anion components. Moreover, suitable commercially available salts include derivatives of N, P, K, S, C, H, O, Cl, secondary and micronutrients; and other agriculturally compliant combinations of compounds known to the art. For example, N as amines, amides, nitrates, polyacylamines; C as carbonates; Cl as chlorides; P as phosphates, phosphites; S as sulfates; H as acids; OH as bases; and the like.

Contributions of Exemplary Components to Functions

Glycan composites (GC) are composed of several compounds having distinct chemical characteristics, each contributing desirable properties to the whole. It has been most elucidative to discover that when components of the glycan composite are applied separately to crops in the field, performance is inconsistent. Although direct application of each component to separate plant populations is possible, it is not preferred for lack of beneficial effect. Therefore, experiments were undertaken to verify functional exemplary glycan composites; and, at the same time, showing that each of the separate components did not function adequately alone.

Photosynthetic crops grow by means of respiratory metabolism of photosynthates to build, for maintenance and to reproduce. However, the ratio of respiration to photosynthesis is less than a third. Regulation of crop growth through more efficient transfer of photosynthates to respiration than before, by application of glycan composites in accordance with embodiments disclosed herein, were used to raise that ratio. This was expedited by efficient treatments with glycan composites in the dark (i.e., in an environment where sunlight does not reach); whether to seeds and roots underground during the day; or to roots and/or shoots at night, for example. It would be of benefit to agriculture to enhance productivity by optimizing treatments with glycan composites to seed, fruit, flower, sap nectar, photosynthate, root, stem and/or trunk; that is, via shoot and/or root applications, through these novel systems, as well. Taken together, application of glycan composites to achieve a positive effect is realized by embodiments disclosed herein.

In contrast to photosynthetic leaves, seeds are entirely respiratory. As a consequence, hastening germination has resulted from applications of exceedingly low doses of GC to seeds as compared to nutrient control. Early growth responses to separated components were compared to the unified GC and results were analyzed for statistically significant compared means. It was clearly indicated that separate components did not work; but together, they contributed to efficacy. Furthermore, the transition metal$^{2+}$ coordination complexes of the embodiment that included the full set of D-block transition metals$^{2+}$ improved performance of composite formulations.

Respiration is dependent on available oxygen ($O_2$) and $O_2$ was enhanced through co-application or otherwise exposing crops under GC treatment to elevated $O_2$. Site-directed $O_2$ enhancement, in particular to roots or seeds, was achieved more efficaciously in the field by application of $O_2$-generating compounds such as peroxides. Suitable inexpensive peroxides include $H_2O_2$ and carbamide peroxides, while $O_2$-generating granular compounds are known to the art, such as, $CaO_2$ and/or $MgO_2$ that slowly released $O_2$ while crops were under GC treatments. $CaO_2$ and $MgO_2$ provided $O_2$ enriched environments that supported respiration, particularly when applied to seeds or roots, as separate oxygen sources in conjunction with formulations of the embodiment. Peroxides are $O_2$-generating components that may be formulated into dry products, but preferably are stored and applied separately to the crop before, during or after treatments with GC. Peroxides tend to destabilize and decompose GC-concentrates, thus, shortening shelf life.

An exemplary $O_2$-generating co-application method follows: Prior to treatment with GC, liquid $H_2O_2$, 10-100 grams granular $CaO_2$ and/or $MgO_2$ was incorporated at 15-30 cm soil depth at a rate of 50 Kg/ha during the crop season; and/or potting media or planting hole soils were mixed with 10-20 g/L prior to transplanting. GC was applied as a side dressing or spray drench to the photosynthetic organism to the same acreage. Thereafter, while the plant was under GC-treatment, the peroxide slowly released $O_2$, advancing respiration in conjunction with the actions of GC. Injecting $O_2$ gas may be undertaken, primarily by bubbling into liquid media to saturation. Co-applications of $O_2$-generators with glycan composites were synergistic, resulting in enhanced quantities of productivity.

Under circumstances in which $O_2$ could not be elevated, alternate methods were applied to provide an environment conducive to respiration wherein photosynthetic organisms under cultivation. Thus, treatments with glycan composites were undertaken in conjunction with exposure of crops to respiration accelerators, either by addition to or incorporation with glycan composites. Respiration accelerators were selected from the following: iP, such as for example, salts of phosphoric acid, such as, ammonium, potassium and sodium phosphates; Gly-phosphates such as Glc-phosphates and Man-phosphates, $Glc_2$-phosphates such as mannobiose-phosphates, sucrose-phosphates, trehalose-phosphates, and xylobiose-phosphates; plant growth regulators, such as, auxins; and oxaloacetic, aconitic, citric, fumaric, glutaric, malic, and succinic acids. The aforementioned acids also serve as anionic components of the coordination complex, added at a minimum of 10:1 anion:cation ratio.

Materials and Methods

Germination and early growth of Burpee Sweet Corn cv. Bi-Licious Hybrid was tested for response to various components of composite formulations. Rapid assays of seedling growth were undertaken with hydroponic cultures in which aqueous media were sterilized and cooled. Seeds were examined to exclude aberrantly large, small, or damaged seeds, prior to treatment. Plants were maintained in the dark for respiration at 30° C. Exactly 48 seeds were sown per 15 cm sterile disposable plastic Petri dish on Whatman paper circles moistened with nutrient control or treatments. Replicates numbered 8 per treatment (n=8). Germination was established when radicle emergence was observed for 50% of controls after 30 hours. Treatment and control solutions were prepared by dissolving nutrients in deionized ultrapure water. In place of stainless steel vessels and stirrers, plastic laboratory utensils were utilized to prevent intrusion of $Ni^{2+}$ and other metals. Cross-contamination with nutrients was avoided by disposing of plastic utensils immediately after use. Stock solutions were from reagent grade compounds. The aqueous glycan stock solutions of the GC in this investigation were 1-15% $Man_n$ glycan deglycosylates that were obtained by acetolysis of ivory nut flour in acetic acid:acetic anhydride:sulfuric acid 25:25:1. The 0.0001-5% $Ca^{2+}$ and transition metals $Fe^{2+}$, $Mn^{2+}$, $Zn^{2+}$, $Co^{2+}$, and $Ni^{2+}$ (Cat) were prepared by sequestration in a blend of 1 mM citrate, 5 mM malate, and 1 mM succinate, abbreviated CMS. The GC was applied at 10 µM $Man_n$ concentration. Ca- and Mn-EDTA salts are limited ions, abbreviated EDTA. Other concentrations applied were 1 µM $Man_3$ and 100 µM $Man_1$. $Man_1$-CatCMS was formulated with Cat-CMS transition metal$^{2+}$ coordination complexes for comparison to $Man_1$-EDTA, and so forth. Water was provided as a negative control.

Results

As presented in Table 2, corn seeds treated with GC showed highly significant acceleration of germination mean counts (p=0.000) as compared to those of separate components, Cat, glycan, CMS alone. Counts of CMS, glycan, and Cat were the same as for water; and there was no difference between water and Cat. Whole GC showed significant enhancement as compared to G-EDTA. GC showed borderline significant improvement when compared to glycan with CaMn-CMS, indicating that the whole Cat improved efficacy of the GC over the contribution of limited ions. Thus, both Cat and CMS contributed to germination in the GC. Furthermore, composite formulations in which the glycan was substituted with $Man_1$ or $Man_3$ with Cat CMS, showed significant improvements of germination as compared to the $Man_1$ and $Man_3$ formulations with limited ions and with EDTA salts that did not enhance respiration.

Conclusions

In the whole GC, the components contributed to respiration and growth; yet, in contrast, individual components applied separately did not work. The full complement of the transition metals$^{2+}$ in Cat, in particular in CMS transition metal$^{2+}$ coordination complexes, significantly improved the product as compared to limited ion formulas. Selection of suitable anionic components of the transition metal$^{2+}$ coordination complexes that facilitated respiration contributed to the GC significantly as compared to EDTA that did not. Remarkably, the potencies of glycan and $Man_3$ composites were orders of magnitude greater than $Man_1$, both showing germination at far lower doses than $Man_1$. Composites were found to be applicable toward significant improvements of $Man_1$ and $Man_3$ formulations, an unexpected outcome of the investigations. Notably, post-germination applications of GC with transition metal$^{2+}$-alkyl amide coordination complexes resulted in a trend toward accumulation of photosynthates, particularly in environments of reduced oxygen tension. For example, applications with GC-CaMnEDDHA 1 week prior to lettuce leaf harvest resulted in higher Brix than whole GC and control.

TABLE 2

Effects of components of formulations on germination of corn showed complete glycan composites function best. Statistical significance of differences between mean counts of germinated seeds grown on various components as compared to the unified glycan composite included the following: Cat = non-chelated $Ca^{2+}$, $Fe^{2+}$, $Mn^{2+}$, $Zn^{2+}$, $Co^{2+}$, and $Ni^{2+}$; CMS = citrate malate succinate; EDTA = Ca-EDTA salts + Mn-EDTA salts; GC = GC Cat-CMS; G-CaMnCMS = glycan and $Ca^{2+}$-$Mn^{2+}$-CMS; Count = germinated seeds mean count; n = 8 for all replicates; and p = significance.

| Compared treatments | Count | p |
| --- | --- | --- |
| GC vs Glycan | 46 vs 23 | 0.000 |
| GC vs CMS | 46 vs 23 | 0.000 |
| GC vs Cat | 46 vs 23 | 0.000 |
| Cat vs Water | 23 vs 23 | 0.601 |
| GC vs G-EDTA | 46 vs 36 | 0.043 |
| GC vs G-CaMnCMS | 46 vs 38 | 0.054 |
| $Man_1$CatCMS vs $Man_1$EDTA | 39 vs 27 | 0.025 |
| $Man_3$CatCMS vs $Man_3$EDTA | 45 vs 29 | 0.016 |

Preservatives for Liquid Concentrates

It is often advantageous to provide glycan composite products as 10 ppm-30% concentrates that may be shipped in dry or liquid form while kept under cool, dry, dark storage conditions; but inherent to organic compounds that comprise glycan composites is that the complex was consumed by various and sundry microbes as well as by plant cells. Therefore, measures must be taken to preserve the compositions from spoilage, particularly of the aqueous products. For storage, especially of liquid compositions, suitable preservative agents may be incorporated to the formula to improve the stability of products. Commercial preservative agents include biocides and germicides, such as for example, the following: peroxides; sodium hypochlorites; bleaches; acids; bases; oxidizing agents; formaldehyde-releasing preservatives such as 1,3-dimethylol-5,5-dimetlhydantoin, quaternium-15, bronopol, diazolidinyl urea, Na-hydroxymethylglycinate; silver; copper acetate; permanganates; dinitromorphoiines; phenolics, such as, 4- Chloro-3-methyipheno and 2-phenylphenol; thiazolinones and the preferred isothiazolinones (IT), such as, benzoisothiazolinones (BIT), methylchioroisothiazolinones and methyiisothiazolinones (MIT). IT is a phytobland antimicrobial in the range of 1-800 ppm. The preservatives are recommended for formulation into liquid glycan composite concentrates in the range of label rates, from 1 ppm to 1%. For example, BIT in the range between 50 to 750 ppm, preferably between 100-300 ppm in liquid concentrates was safe and effective. Thus, liquid formulation of the glycan composite may be blended with any antimicrobial, yet they must be selected from phytobland preservatives as per embodiments disclosed herein. In a glycan composite product present as a concentrated product composition in the range of between 10 ppm to 30% glycan composite for dilution prior to application to a crop of photosynthetic organisms for the enhancement of productivity, a suitable concentrate comprises one or more of glycan deglycosylates in the range of between 1 ppm to 20% and one or more transition metal$^{2+}$ coordination complexes in the range of between 1 ppm-10% and a preservative in the weight range of 50 ppm to 1%.

Exemplary Preservative Maintains Potency of Glycan Composites

The effects of preservatives on potencies of plant growth regulator glycan composites were compared. The experiments quantified root growth. The results showed that potency was retained after storage for one month with preservatives. In contrast, formulations without preservative lost activity.

Materials and Methods

Early post-germination Swiss Chard (*Beta vulgaris* subspecies *cicla* L., cultivar "Fordhook® Giant") root growth was tested for response to glycan composites (GC) supplemented with the preservative, BIT. Preliminary experiments of preservatives that were narrow in antimicrobial effect, not suitable for food use, or that were phytotoxic at antimicrobial doses were excluded. Roots of Swiss Chard germlings showed responses of improved growth in length within a week of application of GC and this corresponded to weight increases. The branched N-linked glycan, 100 ppm $Man_3GlcNAc_2$ deglycosylate, was selected to initiate blending the glycan composite with agitation into water. The glycan composite was further formulated by stirring 5 mM malic acid anion component in the glycan-water solution with aqueous $metal^{2+}$-nitrate salts; resulting in the 5 mM malate transition $metal^{2+}$ coordination complex of 1-5 ppm $Ca^{2+}$ and transition metals 1-3 ppm $Fe^{2+}$, 0.1-0.5 ppm $Mn^{2+}$, 0.2-1 ppm $Zn^{2+}$, 0.01-0.1 ppb $Co^{2+}$, and 0.001-0.01 ppb $Ni^{2+}$. The preservative, Proxel™ GXL, was selected from IT antimicrobials and was applied to 1 ppm to 30% liquid product concentrates for storage in the range of 100-200 ppm. Formulations were stored for a month at 35° C. prior to testing. Concentrated formulations were diluted in water as needed immediately prior to treatment of seedlings. Solutions incorporated reagent grade compounds of other required elements.

Rapid assays of root growth were based on modified methods of the aforementioned hydroponic culture on moistened Whatman 598 Seed Culture paper circles and in which treatments and aqueous media were not sterilized prior to application. Root mg weights were taken with a calibrated Mettler digital balance. Terminology used herein indicates the omission or inclusion of nutrients, as follow: GC=10 µM glycan composite without IT, GC-IT=GC with IT; $Man_1$=100 µM $Man_1$-GC without IT, $Man_1$-IT=$Man_1$-GC with IT; MG=375 mM methyl-D-$Glc_1$-GC without IT, MG-IT=MG with IT; $Man_3$=1 µM $Man_3$-GC without IT, $Man_3$-IT=$Man_3$-GC with IT.

Preservatives Retain Potencies of Stored Formulations

Post-germination Swiss chard seedlings treated with glycan composite without preservative showed losses of potency of as much as half that of the same formulation with IT. Results of means±SE are presented in Table 3. Doubling (2×) the concentration of composite formulations without IT resulted in higher root weights than control, yet at 20% lower yields than 1× concentrations with IT. Formulations without a preservative lost at least half their potencies after 1 month of storage. The retention of original efficacies of GC formulations with preservatives shows a distinct improvement of all products that must be stored until end-user sales and applications.

TABLE 3

Effects of composites with or without preservative IT on root growth of Swiss chard seedlings are listed in order of weight yields. Formulations were assayed after 1 month of storage and those with IT showed higher yields than formulations without IT. Mean yields without IT were equivalent to those of the water control. Values are measures of root mean milligram (mg) ± standard error (SE). Abbreviations: GC = GC without IT, GC-IT = GC with IT; and so forth. $Man_1$ = $Man_1$-GC; MG = methyl-D-$Glc_1$-GC; $Man_3$ = $Man_3$-GC.

| Treatment | Mean ± SE (mg) |
|---|---|
| GC-IT | 12 ± 0.3 |
| $Man_3$-IT | 12 ± 0.4 |
| $Man_1$-IT | 11 ± 0.5 |
| MG-IT | 11 ± 0.6 |
| 2 × GC | 10 ± 0.5 |
| 2 × $Man_3$ | 10 ± 0.6 |
| GC | 8 ± 0.4 |
| $Man_3$ | 8 ± 0.5 |
| $Man_1$ | 8 ± 0.6 |
| MG | 8 ± 0.6 |
| Water | 8 ± 0.5 |

In the example of FIG. 1, a plant cell was exposed to the solution of glycan composite that was transported into the cell. In accordance with glycoprotein binding affinities and specificities, the glycan composite displaced photosynthates from storage making them available for respiration, growth and germination. This redirected flow of energy resulted consistently in faster germination than nutrient controls, among other features.

A suitable synthesis to make a glycan composite is as follows. In certain embodiments, the glycan composite was formulated with one or more of the aforementioned transition $metals^{2+}$. To make the transition $metal^{2+}$ coordination complex, one or more of the appropriate anionic components, such as for example, 0.1-5 mM citric, malic, succinic, and/or oxaloacetic acids were added and dissolved in water; and then suitable ppb-ppm $metal^{2+}$ components of the transition $metals^{2+}$ coordination complexes were stirred in to dissolve in the aqueous formulation. Thus, for example, 1-10 ppm $Ca^{2+}$ and 0.1-1 ppm $Mn^{2+}$, one or more of 1-10 ppm $Mg^{2+}$, 1-3 ppm $Fe^{2+}$, and 0.2-1 ppm $Zn^{2+}$, and 0.01-0.1 ppb $Co^{2+}$ and 0.001-0.01 ppb $Ni^{2+}$ were the added $metal^{2+}$ components. Formation of proper transition $metal^{2+}$ coordination complexes requires at least 1:10 and preferably 1:25 transition $metal^{2+}$-cation:anion ratios. The glycan composite unit was completed by blending in 1 µM to 500 mM glycan. Formulations that were to be stored for more than a day before applications to plants included label quantities of a broad spectrum preservative selected from IT, BIT, MIT, hydantoin, and the like. The method may also comprise the step of blending one or more agricultural surfactant/emulsifiers, and/or other agricultural additives/adjuvants at label quantities that achieve at least critical micelle concentrations, in particular, for foliar applications.

Suitable surfactants and emulsifiers include anionic, cationic, nonionic, and zwitterionic detergents; for example, amine ethoxylates, alkyl phenol ethoxylates, phosphate esters, polyalkylene oxides, polyalkylene glycols, polyoxyethylene (POE) fatty acid esters, POE fatty diglycerides, POE polymers, POP polymers, PEG polymers, protein surfactants, sorbitan fatty acid esters, alcohol ethoxylates, sorbitan fatty acid ester ethoxylates, ethoxylated alkylamines, quaternary amines, sorbitan ethoxylate esters, substituted polysaccharides, alkyl polyglucosides (APG), APG-citrates, alkylglycosides such as methylglucosides, alkylmannosides, methylmannosides, ethylacetoacetates, N-acetylglucosamines, meglumines, glucamides, dimethylglucamines, copolymers, siloxanes, tallow amines, and blends. When applying glycan composites to foliage, the formulation may further comprise one or more aqueous surfactants and applying the resulting mixture by spraying, misting, fogging or electrostatics to the plant foliage in an amount between about 1 to 100 gallons per acre, preferably 10 to 80 gallons per acre.

Blending the GC with nutrients sustained vigor, expanded root systems, enhanced plant growth, enlarged floral displays, promoted fruiting and improved flavor; a rendering that was particularly important in nutrient-deficient soils and water. Essential primary elements include, N—P—K. Essential secondary nutrient elements include Ca, Mg, and S. Essential micronutrient elements include B, Cl, Co, Cu, Fe, Mn, Mo, Ni, Si, Na, and Zn. Preferred nutrients are not selected to the exclusion of other elements, ions, or salts, and, depending on the situation, may be available in the soil and water in particular abundance such that supplementation is unnecessary for productivity; therefore, nutrient supplementations are applied at rates compliant with government agricultural regulatory agencies following instructions on labels. Suitable sources include salts and minerals generally known to the art. For example, the most highly preferred micronutrient selections to the compositions may include 0.5-5 ppm chelated Fe and/or Zn; and applying a suitable amount of the resulting mixture to one or more plants.

Plant nutrient phosphorus may be obtained from one or more of the following sources: iP, phosphorus rock, phosphoric acids, phosphates, phosphites, pyrophosphates, steric P, guano, manures, seaweed extracts, bird droppings, fishery, poultry and livestock waste and the like. Organic sources of P tend to be far too expensive to apply to fields in the 1-20% ranges of iP, however, at ranges below 1% concentration they often proved effective as respiration accelerators. Organic sources of P included, for example, glycerophosphates and the aforementioned sugar-phosphates were utilized in the range of between 0.1 ppm to 800 ppt.

Nitrogen may be obtained from one or more of the following sources: nitrate N, such as, nitric acid and salts, thereof; ammoniacal N, such as ammonia, UAN, ammonium nitrate, ammonium sulfate; urea N such as methylene urea, urea-formaldehyde, urea, low biuret and preferably ultralow biuret urea; amine/amide/amino N, such as alanine, arginine, asparagine, aspartate, cysteine, glutamate, glutamine, glycine, ornithine, proline, selenocysteine, taurine, tyrosine, histidine, isoleucine, leucine, lysine, methionine, phenylalanine, threonine, tryptophan, valine; salts, such as sodium or potassium glutamate; derivatives; blends; and the like; and mixtures of amino acids; proteins, such as from, glutens, caseins, fish, and blood; hexamines; and combinations, thereof. Nutrient elements were metabolized to all biochemical, growth, reproductive and structural components of photosynthetic organisms.

Applications of glycan composites provide opportunities to supplement plant nutrient deficiencies by use of tank mixes or by applications formulated with a selection of additives. The amounts of plant nutrients were applied in accordance with labeling of guaranteed analysis by governance boards at rates known to the art. Supplementation comprised the steps of dissolving plant nutrient components into aqueous solution, resulting in a mixture comprising glycan composites. For example, in certain embodiments, glycan composites were supplemented with 100-2000 ppm N, 50-250 ppm P; 50-2000 ppm K; 1-100 ppm Ca; 1-10 ppm Fe; 0.5-6 ppm Mn; and/or 0.5-5 ppm Zn. Various glycan composite formulations may be classified as plant biostimulants that may benefit nutrient use efficiency, improve tolerance to abiotic stress, and increase yields. Biostimulants generally include natural products, such as for example, plant, algal, fermentation and animal metabolites; humates; microbials; biochemicals; and the like. Other glycan composite formulations may be classified as elicitors that generally include natural products, such as for example, algal, fermentation and animal metabolites; proteins; enzymes; microbials; and the like.

Embodiments disclosed herein as applied to crops are of glycan composites made into compositions of which the compounds themselves serve as resources for control of photosynthetic organisms, including live photosynthetic Eukaryotes; and, for the most part, agricultural Archaeplastida plants. As such, the glycan composite may be appropriately formulated with agrochemicals and are rendered into aqueous compositions that are capable of facilitating the growth of photosynthetic organisms, particularly cultivated flowering plants. The methods disclosed herein may be applied to safely enhance the balanced metabolism of exogenous components that contribute to the productivity of photosynthetic organisms. While, at the same time, they may be methods for applications of compositions of the glycan composite in the beneficial treatments of photosynthetic organisms, that, further, may be made to enhance the healthy growth and quality of crops.

Although the present inventor is not to be bound by any theory, the glycan composites of the embodiments disclosed herein feature a "lock and key" mechanism. A glycan with a suitable terminal ligand shows high binding affinity to a specific receptive glycoprotein. The lock is the glycoprotein and the key is the terminal ligand. The "tumblers" of the glycoprotein-lock are the internal structural sites of calcium and manganese. When the glycan key opens the lock, photosynthates are displaced to accumulate or to move on to respiratory metabolism; and thus, opening the option for selection of respiration accelerators in the anionic components of the transition metal$^{2+}$ coordination complex. During daylight hours, roots consume those photosynthates. Respiring roots produce carbon dioxide, a portion (10% to 20%) of which is transported up to the shoots; and enhanced photosynthetic carbon fixation results. Thus, the glycan composite may be useful to reduce energetic losses to photorespiration by these treatments of photosynthetic organisms through their reach into sap nectar that modulate quality of sweetness measured as Brix. In particular, when, for example, plants are cultivated under photorespiratory environmental stresses such as saturated sunlight intensities, droughts and heat, the glycan composite may benefit yields. Moreover, the embodiments provide glycan composite systems for regulating the accumulation of photosynthates through the deceleration of respiration for flavor and nutritional enhancement by human consumers, livestock, poultry, and as well as, in robust nectar for pollinators.

In accordance with embodiments disclosed herein, a novel plant growth regulator system is introduced that advances photosynthetic flux to drive a photosynthetic organism to accumulate photosynthates. This is initiated, for example, by creation of novel crop inputs of glycan composites that may be applied to photosynthetic organisms. Glycan composites may be comprised of branched glycans with transition metal$^{2+}$-polydentate anions. The preferred anions of this embodiment are alkyl amides selected from salts of EDTA, EDDHA, HeEDTA, DTPA, HBED, MGDA, GLDA, and the like. In addition, oxygen-starved environments under reduced oxygen tension, in the range from 0-10% $O_2$, may be induced physically by respiration decelerators, such as by flooding roots with irrigation water, by storing plants or their parts in nitrogen gas, or by elevating $CO_2$ concentrations. Alternatively, respiration decelerators may be selected from suitable plant growth regulators, co-applied according to agriculturally labeled methods known to the art; for example, plant growth regulators at 1-750 ppm dosages were selected from various suitable cytokinins, salicylic acids, and/or, gibberellins; and derivatives and the like.

Photosynthetic organisms respond consistently to glycan composite components when applied, preferably suitably formulated and rendered into potent formulations such that they facilitate the growth and quality of photosynthetic organisms as well as provide an array of physiological benefits that enhance their marketable qualities.

In accordance with embodiments disclosed herein, the complexes of embodiments may be applied separately, serially, or simultaneously. Indeed, particularly during physiological stress, by action of glycan composites on sap nectar of a photosynthetic organism, productivity was enhanced by the increased flow of photosynthates to respiratory metabolism in photosynthetic organisms in accordance with the aforementioned lock and key mechanism of the embodiments disclosed herein.

In certain embodiments, concentrated glycan composite products in compositions comprising at least glycan deglycosylates in the range of between 0.1 ppm to 30% and one or more transition metal$^{2+}$ coordination complexes in the range of between 0.1 ppm to 20%, are made ready for application by dissolving an amount of glycan composites in the preferred carrier, water. Alternative carriers include, for example, vegetable and mineral oils, alkyl acetoacetates, or aliphatic alcohols. Therefore, it is made convenient for the grower to stir the final solution containing glycan composites into water as the carrier of choice for final dilution. In most instances, agitation and 25-800 heat facilitates the dissolution of the dry product in the carrier. The glycan composite is amenable to water-borne agricultural systems, such as, hydroponic and water cultures, by metered application with pumps into the medium, immersion of roots in diluted glycan composites, or as a foliar treatment.

The formulations employed may include any of a wide variety of agronomically suitable additives, adjuvants, or other agriculturally compliant ingredients and components (hereinafter "additives") that can improve or at least do not hinder the beneficial effects of the glycan composite when applied at label rates. Generally accepted additives for agricultural application are periodically listed by the United States Environmental Protection Agency. In particular, foliar compositions may contain spreaders present in an amount sufficient to further promote wetting, emulsification, even distribution and penetration of the active substances. Spreaders are typically organic alkanes, alkenes or polydimethylsiloxanes that provide a sheeting action of the treatment across the phylloplane. Suitable spreaders include paraffin oils and the foregoing surfactants. Penetrants include, for example, alkyl acetoacetates, sodium dodecylsulfate, formamides, DMSO, and alcohols.

Embodiments herein are useful when blended or tank mixed with various plant treatments such as agriculturally compliant pesticides, insecticides, herbicides, plant growth regulators, fungicides, germicides, biocides, elicitors, biostimulants, antagonists, antitranspirants, synergists, systemics, surfactants, spreaders, stickers, vitamins, minerals, salts, solvents, genetics, bioagents, and the like. Herbicides that are based on ammonia metabolism, for example the glufosinates, Ignite®, Rely®, and Liberty®, are safened by application of glycan composites, reducing phytotoxicity in related herbicide-resistant GMO crops; and per application at label rates.

EXAMPLEs of suitable additives and adjuvants include the following: minerals such as limestone, iron filings, and the like; salts such as ammonium nitrate, ammonium sulfate, potassium phosphate, calcium permanganate, calcium-phosphates, calcium acetates, calcium aconitates, calcium citrates, calcium citrate-phosphate, calcium fumarates, calcium malate, calcium malonate, calcium maleate, calcium malate-phosphate, calcium gluconates, calcium glutarates, $CaO_2$, calcium succinates, calcium chelants, calcium nitrate, calcium glycerophosphate, manganese-phosphates, manganese acetates, manganese citrates, manganese fumarates, manganese glutarates, rhodochrosite manganese carbonates, manganese oxides, $MgO_2$, manganese malate, manganese malonate, manganese maleate, manganese succinates, manganese chelants, and the like; co-solvents such as alcohols, ketones, oils, lipids, water, and the like; genetically modified organisms and genetic materials such as Bt, genes, sequences, RNA, DNA, plasmids, genomes, and the like; bioagents such as microbes, yeasts, bacteria, viruses, vectors, and the like; and colorants, dyes, and pigments such as annatto, methylene dyes, cobalt blue, and indican. Other constituents that may be added to the compositions include soil conditioners, antibiotics, plant growth regulators, GMO, gene therapies and the like. Among the plant growth regulators which may be added to the formulations of the present invention are auxins; brassinolides; cytokinins; gibberellins; salicylates; benzyladenine; amino acids; benzoates; carboxylic acids, vitamins; carbohydrates; herbicides, such as, phosphonomethylglycines, halosulfuron alkyls; selective herbicides, such as, sethoxydims and sulfonyl ureas; salts, esters, phosphates, hydrates and derivatives thereof; and genetic compositions.

Glycan composite technology is appropriate for, but not limited to, crop application in the dark or shade, as during periods of maximum respiration; as well as under direct sunlight. In general, glycan composites are readily applied directly to shoots and/or roots and/or seeds; and/or parts, thereof, including cuticle, epidermis, flower, fruit, sap, nectar, bark, stem, foliage, needle, blade, phylloplane, spine, trichome, root hair, tap root, cotyledon, cone, and the like. The concentration of glycan composites in the formulations as applied to photosynthetic organisms should generally be between about 1 ppb to 1% and more preferably between about 10 ppb to 500 ppm. For specific applications, the concentration at the point of applications may be lower for roots than for shoots; thus, between the concentrations of 1 ppb-300 ppm for root application. Glycan composites may be applied to rooting media and then watered in or may be diluted first in an aqueous carrier and then applied to the media. On foliage, treatments generally are applied in a mist, fog, spray, drip, stream, dip, coating, or sprench between 1 ppb to 1% concentrations of the glycan composite. When diluted in an aqueous carrier, the resulting diluted glycan composite is applied to a photosynthetic organism in an amount of about 1 to 500 gallons/acre.

Figure 2:
FIG. 2 exhibits drawings of exemplary branched glycan deglycosylates suitable for formulation in glycan composites. The core structure in the top left corner corresponds to a trimannopyranosyl-N-glycan whilst other structures display higher orders of branching. The invertase core structures shown are suitable for selection of one or more branched glycan deglycosylates with preferred terminal ligands of the glycan composite. Exemplary high mannopyranosyl N-glycans with terminal mannopyranosyl ligands show progressions to higher orders of branching from top to bottom of the page. The top left $Man_3GlcNAc_2$ structure corresponds to "Ethan" in EXAMPLEs 1, 6, 9, 16, and 17. Abbreviations: Glc—Glucopyranosyl; Man—Mannopyranosyl; NAc—N-Acetyl.

The following examples are provided to illustrate the embodiments disclosed herein and should not be construed as limiting. In these examples, purified water was obtained through reverse osmosis; transition metal$^{2+}$ coordination complex components and surfactants were obtained from Brandt. Abbreviations used in the following examples are defined as follows: "°" means ° C.; "Sil" means organosiloxane/copolymer blend; "12-26-26" means Brandt 12-26-26 Micro, N—P—K with B, Cu, Fe, Mn, Mo, and Zn;

"αManda" means methyl-α-D-Man$_n$, n=1-3; "GG" means combinations of branched O-linked Gal$_{1-12}$Man$_2$, from partially hydrolyzed guar gum; "Ag" means GlcNAc$_{1-3}$; "Ethan" means branched Man$_3$GlcNAc$_2$ (FIG. 2); "Cat" means a blend of soluble 1 ppm Fe$^{2+}$, 0.5 ppm Mn$^{2+}$, 0.5 ppm Zn$^{2+}$, 0.01 ppb Co$^{2+}$, and 0.01 ppb Ni$^{2+}$; "CMS" means 0.1-5 mM citrate, malate, maleate and/or succinate transition metal$^{2+}$ coordination complex; "IT" means isothiazolinone preservatives; "MnCO$_3$" means manganese carbonate; "AMS" means ammonium sulfate; "MKP" means monopotassium phosphate; "DKP" means dipotassium phosphate; "MAP" means monoammonium phosphate; "DAP" means diammonium phosphate; "NH$_4$OH" means ammonium hydroxide; "KOH" means potassium hydroxide; "Ca(OH)$_2$" means calcium hydroxide; "L" means Liter; "ml" means milliliter; "mg" means milligram; "g" means gram; "Kg" means kilogram; "mM" means milliMolar; "Micronutrient" means trace quantities of soluble B, Ca, Co, Cu, Fe, Mg, Mn, Mo, Ni, Zn; and KOH, Ca(OH)$_2$, NH$_4$OH, MnCO$_3$, MAP, DAP, MKP and DKP are plant nutrients and buffering agents.

The following are examples of specific formulations that may advantageously be employed in methods to treat photosynthetic organisms such as plants and to enhance growth in the same. The following examples are intended to provide guidance to those skilled in the art and do not represent an exhaustive list of formulations within the scope of the embodiments disclosed.

EXAMPLE 1

Glycan Composite Formulation for Application to Roots

| Ingredient | Range g/L | Preferred g/L |
| --- | --- | --- |
| Ethan | 10 ppb to 1 ppm | 100 ppb |
| Aconitic acid | 0.001-10 | 0.05 |
|  | Range ppm | Preferred ppm |
| Ca$^{2+}$ | 1-10 | 5 |
| Cat | 0.01-10 | 3 |

This formulation may be further supplemented with components of transition metal$^{2+}$ coordination complexes selected from citrates, fumarates, glutarates, malates, oxaloacetates, succinates; and Mg. Root glycan composites were dissolved into 1 L of water with stirring at room temperature, 25 to 35° C.; and adjusted by titrating KOH to pH 5-7.50 to 450 gallons/acre applied as close to the roots as possible either by side dressing and/or through drip irrigation. With irrigation, the treatment was watered into the soil, toward the roots for enhanced photosynthates, quality and quantity.

EXAMPLE 2

Foliar Glycan Composite Formulation

| Ingredient | Range g/L | Preferred g/L |
| --- | --- | --- |
| Malic acid | 0.7-50 | 3.5 |
| GG | 0.001-10 | 1 |
| AMS | 0.6-3 | 3 |
| Sil | 0.3-3 | 0.8 |
|  | Range ppm | ppm |
| Ca$^{2+}$ | 1-100 | 1-5 |
| Cat | 0.1-6 | 1-3 |

Ca$^{2+}$ and Cat were dissolved with malic acid in 1 Liter of water. Other ingredients were added, dissolving each, one at a time; and the solution was adjusted within a range of pH 5 to pH 5.5 by titration with DKP/MAP, as needed. Transition metal$^{2+}$ coordination complexes were selected from 0.01 ppb Ni and Co; and transition metal$^{2+}$ coordination complexes may include ppm to ppt aconitates, citrates, fumarates, glutarates, oxaloacetates, and/or succinates. Foliar sprays were applied to glisten, approximating 75-100 gallons/acre resulting in enhanced photosynthates, quality and quantity of harvests.

EXAMPLE 3

Field and Flower Formulation of the Glycan Composite

| Ingredient | Preferred g/L | Upper Range g/L |
| --- | --- | --- |
| 12-26-26 | 0.3 | 10 |
| Ag | 0.1 | 0.5 |
| Ca$^{2+}$ | 0.005 | 1 |
| Succinic Acid | 0.7 | 5.0 |
| Field and Flower Formulation | | |

Components were pre-blended as dry concentrates to create a kit for which the dry components were stored and, later, dissolved together in water.
For admixture, components were blended in 1 L water until dissolved. The solution was applied directly to roots.
Supplementation with 0.5-3 g/L CMR or other agricultural wetting agents was undertaken for foliar application.
Field Formulation was preferably applied as a foliar spray to shoots of plants at 50 to 100 gallons/acre for enhanced photosynthates, quality and quantity.
This solution may be further supplemented with transition metal$^{2+}$ coordination complexes selected from Ni, Co; aconitic, citric, fumaric, glutaric, malic, and oxaloacetic acids;
EDTA, EDDHA, HeEDTA, DTPA, HBED, MGDA, GLDA; Mg; and the like.

EXAMPLE 4

Foliar Concentrate

| Ingredient | Range % | Preferred |
| --- | --- | --- |
| αManda | 1-20 | 5-15 |
| Cat | 1-10 | 5 |
| Ca$^{2+}$ | 0.001-5 | 0.03 |
| Citric acid | 1-50 | 5-15 |
| MKP/DAP, pH 5 | 1-25 | 5-15 |
| BIT preservative | 0.01-0.8 | 0.1 |

This formulation may be further supplemented with anionic components of transition metal$^{2+}$ coordination complexes, such as for example, respiration accelerators selected from aconitic, fumaric, glutaric, malic, oxaloacetic, succinic acids, and the like. Alternatively, for accumulation of photosynthates, anionic components were selected from polydentate chelants such as, EDTA, EDDHA, HeEDTA, DTPA, HBED, MGDA, GLDA, and the like.

All components were blended to homogeneity in aqueous solution with rapid agitation until completely dissolved and adjusted to pH 5-5.5 with MKP/DAP. For foliar application, this formulation was supplemented with 0.05% Sil for shoot treatments at 20-100 gallons/acre for enhancement of photosynthates and respiration in a crop.

An exemplary foliar system follows: Bell pepper sprouts were matched and maintained in half-gallon plastic containers each, separated into equal populations of Treated and Nutrient Controls. The glycan composite from this example was diluted to 1% with water and applied to shoots of the Treated population as a foliar spray, while the shoots of the Control population was sprayed with the same concentrations of mineral nutrients in water. In all other ways, Control and Treated populations were cultivated side-by-side under identical field conditions. At harvest, the Treated population averaged 35% bell pepper fruit mean weight yield increase over the control population that proved statistically significant p=0.001; n=30. In addition, sun scorched peppers were absent from treated fruit as compared to controls that showed 1-5% loss from scorched fruit that were not marketable due to unattractive appearance. Thus, enhanced flow of photosynthates resulted in an increase of marketable yields attributable to enhanced aesthetic quality of the final product by treatment with the glycan composite system.

The regulation of flow of photosynthates by glycan composites comprised of αManda was further managed by optional coapplications of the respiration accelerator, 10-100 g $CaO_2$ to soil near roots, for high qualities and quantities of yields.

EXAMPLE 5

Exemplary Foliar PGR

| Component | Range % | Preferred % |
|---|---|---|
| GG | 0.01-10 | 1 |
| Malic acid:maleic anhydride | 0.7-50 | 1 |
| Water | 5-80 | 53 |
| KOH | pH 5-7 | pH 5.5 |
| Cat-malate | 0.01-1 | 0.1 |
| Ca-glutarate | 0.01-0.3 | 0.1 |
| Sil | 0.3-3 | 0.8 |

Mixing Directions t,?

For malolysis, to 50% aqueous malic acid:maleic anhydride 1:1, add GG, and 1% sulfuric acid and heat to 70° C. for 8-24 hours. Add the remaining dry crystals into 0.5 L of water with stirring and after completely dissolved, add the liquid solution into the aqueous solution with rapid agitation, such as stirring. Bring the total volume to 1 L with the addition of water. Adjust to desired pH with $NH_4OH$ or KOH.

After the components are mixed together, they are diluted in water as needed and applied as a foliar spray to shoots of plants, preferably at between 10-100 gallons/acre. This solution may be further supplemented with anionic components of transition metal$^{2+}$ coordination complexes selected from aconitates; citrates; fumarates; glutarates; malates; oxaloacetates; succinates; and polydentate alkylamide chelants for enhanced photosynthates, quality and quantity.

EXAMPLE 6

System for Acceleration of Germination

| Ingredient | Range g/L | Preferred |
|---|---|---|
| Glutaric acid | 0.07-10 | 3 |
| Ethan | 10 ppb-1 ppm | 100 ppb |
| KOH | pH 5-7.5 | pH 5.5 |
| Cat | 0.01-5 | 0.1 |
| $Ca^{2+}$ | 0.01-1 | 0.05 |

This solution may be further supplemented with anionic components of transition metal$^{2+}$ coordination complexes selected from ppm-ppt aconitic, citric, fumaric, malic, oxaloacetic and succinic acids; ppm-ppt polydentate alkylamide chelants; and ppm-ppt Mg.

Radish seeds, 25 per dish, were sown in 16 replicate Gosselin germination dishes on Whatman 598 Seed Culture paper circles moistened with Nutrient Control or glycan composite. Seeds were maintained a constant temperature of 27° in the dark for respiration only. Germination was established at the time at which radicle emergence was observed for 50% of the seeds, $G_{50}$. Results showed accelerated glycan composite mean $G_{50}$=15 hours as compared to Nutrient Control mean $G_{50}$=22 hours; n=8; p=0.001. Treatments of radish by coating seed with 20-50 μg/seed dry weight glycan composite proved highly potent, significantly accelerating germination as compared to Nutrient Controls as a result of enhanced flow of photosynthates. Similar acceleration of germination was observed for radish seeds that were pre-coated with 20-50 μg glycan composite/seed and dried, as compared to nutrient controls.

EXAMPLE 7

System for Enhanced Roots

| Ingredient | Range g/L | Preferred g/L |
|---|---|---|
| Fumaric acid | 0.001-20 | 0.03 |
| GG | 0.001-1 | 0.1 |
| Cat | 0.01-5 | 0.01 |
| $Ca^{2+}$ | 0.01-1 | 0.05 |

This solution may be further supplemented with anionic components of transition metal$^{2+}$ coordination complexes selected from aconitic, citric, fumaric, malic, oxaloacetic and succinic acids; polydentate alkylamide chelants; Mg; and in ppm-ppt amounts. Bell Pepper seeds were sown in 12 replicate plots of uniform sandy loam with label rates of 12-26-26. The glycan composite was formulated in water and adjusted to pH 5.5 with DAP and Control was also adjusted with equivalent P with DAP/MAP. Two weeks after germination, six randomly selected plots were sprenched with glycan composite, targeting the plantings; and otherwise all 12 plots of bell peppers received identical growth maintenance. In order to eliminate crowding, each plot contained 20 plants, spaced 50 cm apart. Plants were harvested with roots intact after 2 weeks; followed by clipping roots from shoots, thoroughly washing off soil and oven-drying. Root dry weights of individual plants were taken. Results showed glycan composite root mean dry weight 1.2 grams as compared to Nutrient Control root mean dry weight 1.0 gram; n=6; p=0.02. Treatment significantly enhanced root dry weights as compared to controls. Sun scorched fruit, though present in controls, were absent from treated plants indicative of enhanced photosynthates and quality of the harvest.

EXAMPLE 8

Exemplary Glycan Composite Enhancement of Hydrostatic Pressure

Fields of *Plumeria* flowers are conventionally cultivated under high ~1500-1700 µEinstein/m$^2$/sec light intensity and low to moderate ~20-30% humidity. Under these environmental conditions, daily hydrostatic pressure responses were observed in the afternoon. Typically, in the early morning, flowering plants are high in hydrostatic pressure, but by mid-afternoon, leaves begin to droop. This cycle of midday wilt showing high to low hydrostatic pressures was visually distinguishable as the elevation of leaves changed from pointing upward to downward, approximately 5 to 20 millimeters (mm). An increase of hydrostatic pressure is prerequisite to growth and was measured according to the change of elevation of foliage, especially during midday. The purpose of the trial was to record changes in hydrostatic pressure of *Plumeria* by measuring mm changes of elevation of leaves and comparing the responses of aqueous nutrient controls against plants to which a single treatment of 1-25 ml of 0.1-5 ppm Ethan glycan composite was applied to roots. The glycan composite formula was from the aforementioned EXAMPLE 6; and optionally, other exemplary glycan composites may be applied for enhancement of hydrostatic pressure. For example, an effective amount of 1-200 ml of 0.1-5 ppm partially hydrolyzed invertase deglycosylates was applied to roots at 8 AM and a subsequent rise in elevation of foliage showing enhanced hydrostatic pressure was observed by noon when controls, at the same time, showed reduced hydrostatic pressure. *Plumeria obtusa* L. variety *obtusa* plants in 4 L plastic containers were allowed a week to acclimate to environmental conditions of direct sunlight and were further observed for consistency of diurnal changes in hydrostatic pressure with evening irrigation once per week. Mid-week between watering, the baseline elevations of leaves were measured late in the morning and marked against rulers; and later, compared against mm elevations of the same leaves 5 hours after treatment.

Results: Foliar elevation was a visually discernible sign of enhanced hydrostatic pressure. The mean +15 mm rise of leaves treated with glycan composite was significant (n=6; p=0.003) as compared to a corresponding mean −5 mm drop in elevation of nutrient control foliage. After treatment with 10 ppb to 800 ppm glycan composites, the rise of foliage was greater in plants treated late in the afternoon, after 3 PM; while at the same time, control foliage showed the most pronounced loss of hydrostatic pressure and drop in elevation caused by midday wilt.

In conclusion, *Plumeria* responded to treatments with increased hydrostatic pressure when controls showed decreases. Similar increases of quality of crop hydrostatic pressure occurred in bell pepper, brassicas, curcubits, pomes, and root crops treated with glycan composites formulated with suitable anionic components of transition metal$^{2+}$ coordination complexes. For example, anionic components were selected from one or more of 10-900 ppm aconitic, fumaric, glutaric, malic, oxaloacetic, and succinic acids; and 10-900 ppm polydentate alkylamide chelants such as EDTA, EDDHA, HeEDTA, DTPA, HBED, MGDA, GLDA, and the like. Growth and development of all photosynthetic organisms are dependent on cell expansion initiated by increased hydrostatic pressure. When hydrostatic pressures increased over the long duration by application of the glycan composite systems of embodiments disclosed herein, the results showed significantly enhanced growth and development of the treated photosynthetic organism. Glycan composite systems coapplied with respiration accelerators improved quantity yields of crops.

EXAMPLE 9

Exemplary Glycan Composite System for Low Light Intensity

Canola vegetative growth of nutrient controls in the shade was compared to shaded populations of Canola treated with branched N-linked glycan composite; and furthermore, treated and controlled populations were cultivated without shade to determine if there was a beneficial productivity enhancement in relatively reduced light environments. Canola seeds were sown in 36-cell plastic flats and showed even growth after 1 month, when shade control and glycan composite-treatments of shaded plants were placed under 50% shade cloth. Plants that were not shaded were under natural midday full light intensity in the range of 1500-1800 µEin/m2/sec; and under 50-85% shade cloth, the low light intensity was in the range of 100 to 900 µEin/m2/sec or less than half full light intensity. Foliar treatments with foliar surfactants were applied, spray to drip ~100 gallons/acre. Full daylight and shaded nutrient controls were compared against foliar glycan composite applied to Canola plants under the same conditions. The glycan composite composition was dissolved in water in the following order: 1-100 µM Ethan; 0.1-25 mM citrate; 0.1-2 ppm Mn-CMS; 1-25 ppm Ca-CMS; and with adjustment to pH 5.5 with DAP, DKP or KOH. Plants were harvested after two weeks and dried at low temperature in a 70° oven for 48 hours. Dry shoots of individual plants were weighed and mean dry weights and T-tests of equality of means of populations are summarized in the table, below.

In conclusion, the population of Canola under Shade Control showed reduced productivity as compared to Full Daylight Control and Shade populations that were treated with glycan composites. Moreover, when shaded plants were treated with glycan composites, benefits of the enhanced quality and quantity of productivities as compared to Shade Control were statistically significant.

| | Shade Control | Shade Glycan composite | Full Daylight Control |
|---|---|---|---|
| Mean dry weight (g) | 0.214 | 0.256 | 0.270 |
| Increase over Shade Control | | 19.5% | 20% |
| Significance | | p = 0.000 | |

EXAMPLE 10

Exemplary Process for Glycan Deglycosylates from Glycoproteins

Many glycoproteins contain glycans that may be processed from seeds of legumes, such as Jack Bean; or by deglycosylation from a number of enzymes. Invertase is a commercially manufactured enzyme from bakers yeasts with suitable glycan components of the interior core or exterior protrusions that may constitute up to three quarters of the total glycoprotein weight. Invertase has preferred branched glycans with terminal Man-ligands from such as GalManProteins; $Man_n$ such as $Man_{1-6}$, Mannotrioses, Mannotetraoses, and Mannopentaoses; $Gal_nMan_n$, such as, $Gal_2Man$ and $Gal_2Man_2$; $Gal_nMan_n$-N-glycans, such as, $Gal_2Man_4GlcNAc$ and $Gal_4Man_{10}GlcNAc_2$; $Man_n$-N-glycans, such as, $Man_3GlcNAc$ and the preferred $Man_{1-15}GlcNAc_2$; and the like. At 270 kDa, the glycoprotein was too large to penetrate foliage. Therefore, to establish a baseline for comparisons to enzymatic digestions, a laboratory process was undertaken primarily to release glycan deglycosylates from glycoproteins, preferably from invertase.

Invertase was denatured in dilute 0.2N $NH_4OH$, pH 12, 80° for 10 min, and neutralized by titration with 0.2N HCl; predigested with 3% trypsin at 370 overnight; and further denatured by boiling for 10 minutes. These protease-treated samples showed moderate 50 μM germination activity in the glycan composite. The samples were deglycosylated by incubation with 200 milliunit endoglucosaminidase H at 37° for a day; and denatured in dilute $NH_4OH$ pH 12 80° for 10 min. Residual protein and peptides were precipitated and removed. Deglycosylates typically comprised blends of O-linked and N-linked mannans and as glycan components of the glycan composite glycan isolates or blends, thereof, exhibited a range of 0.01-1 ppm w/w activity.

The aforementioned deglycosylations by means of proteolytic and glycolytic enzymes were relatively mild, yet involved costly biochemicals. It was found by these experiments that the initial denaturation of glycoproteins with base substantially shortened the subsequent heating duration in acids, and in consideration of energy savings, is preferred. Therefore, the preferred process was by hydrolyzing glycoproteins in components that were commercially available in bulk quantities at relatively low costs. Preferred methods were tested that may be utilized, such as, treatments with acid/base, hydrolysis, hydrazinolysis, and/or fermentations. For example, acetolysis (acetic acid:acetic anhydride:sulfuric acid 25:25:1) of invertase resulted in potent deglycosylates that showed activity as low as 1-100 ppb. Optionally, a novel malolysis of the embodiment was applied by incubation of invertase in maleic acid:acetic anhydride:nitric acid 25:25:10 at 60-80° for 1-24 h. Alternatively, invertase was incubated in citric:phosphoric acids 25:1; saturated citric and/or succinic acids; and/or selected from 0.1-3N mineral acids, such as sulfuric acid, and preferably, was deglycosylated by direct nitrolysis in 1-3 N nitric acid; and incubated with stirring for 1 to 24 h at 40-80°.

The preferred method to partially hydrolyze invertase was as follows: 10-30% invertase was dissolved in alkaline aqueous solution, such as, 0.2-1 N KOH and/or 0.2 N $NH_4OH$ with heating to 40-80° for 1-24 h; 50-60% citric acid was stirred in and incubated 1-24 h, 40-80°. After acid-incubation, the solution was adjusted to between a range of pH 3-6. The partially hydrolyzed invertase, now deglycosylated, was formulated to achieve field application with at least, 1-5 ppm $Ca^{2+}$, 0.5-1 ppm $Mn^{2+}$ and preferably with 0.01-6 ppm D-block transition $metals^{2+}$ selected from $Fe^{2+}$, $Ni^{2+}$, $Co^{2+}$, $Zn^{2+}$; and 1-5 ppm $Mg^{2+}$. Anionic components of transition $metal^{2+}$ coordination complexes were selected from one or more of aconitates, citrates, fumarates, glutarates, oxaloacetates, and succinates. Alternatively, anionic components may be selected from the aforementioned polydentate chelants. For storage of solutions, one or more preservatives were added. Enhancement of quality and quantity of crops of photosynthetic organisms resulted from treatment of said crops with the aforementioned solutions containing in the range of 1 ppb to 10 ppm invertase deglycosylates. For example, when a glycan composite containing invertase deglycosylates was applied to photosynthetic organisms at 100 ppb partially hydrolyzed invertase the dose was 0.1 mg/L.

All of the aforementioned deglycosylation methods rendered similar potencies in their glycan composites. Elimination of any one of the components of the glycan composite decreased activity. The glycan composites comprised of invertase deglycosylates showed orders of magnitude higher potency than the processed botanical gums of the embodiments. Moreover, the manufacturing processes for invertase deglycosylates were simpler and more cost effective than those of other sources. The regulation of flow of photosynthates by glycan composites comprised of invertase deglycosylates was further instituted by optional coapplications of ppm respiration decelerators for flavor enhancement or respiration accelerators for enhancement of quantity yields.

EXAMPLE 11

Exemplary Concentrate for Pollinators

Invertase was denatured in aqueous basic solution by blending 200 grams invertase into 1 Liter aqueous 0.2 N KOH and steamed for 4 h. With stirring, 50% citric acid was added and the solution was heated to 80° for 12 h. After cooling, the solution was titrated to pH 6 with $NH_4OH$; and this was followed by addition of 1% Ca, 1% Mg, 1% Cat; and QID $2^+$ L with water. The final 10% partially hydrolyzed invertase solution contained a blend of 3-7% branched O-linked and N-linked deglycosylates including those shown in FIG. 2. This concentrate was adjusted in the range of pH 4 to 8, preferably pH 5, by addition of appropriate volumes of bases and/or acids as selected from nutrients such as KOH, $NH_4OH$, $Ca(OH)_2$, $MnCO_3$, calcium carbonate, seashell flours, HCl, $H_2SO_4$, phosphoric acids, MAP, DAP, DKP, MKP, and the like; and preferably oyster shell flour. Vigorous crop growth was supported by the presence of nutrient elements that may be formulated at the following preferred rates: primary plant nutrients N—P—K, each 1-25%; secondary nutrients 0.1-1% Ca, 0.05-0.5% Mg, 0.1-1% S; and/or micronutrients 0.0001-0.02% B, 0.0001-0.1% Cl, 0.0001 ppb-0.005% Co, 0.001-0.05% Cu, Fe 0.01-0.3%, 0.02-0.1% Mn, 0.01 ppb-0.005% Mo, 0.001-0.05% Zn, 0.001-0.1% Na, and 0.0001-1 ppb Ni. The glycan composites preferably may be supplemented with D-block transition $metals^{2+}$ selected from one or more of Fe, Mn, Ni, Co, Zn; and anionic components selected from respiration accelerators and polydentate chelants, and the like. In consideration of storage of liquid concentrates, a preservative was essential to the liquid glycan composite concentrated formulation, such as for example, selections from aforementioned IT, in the range of 1 ppm to 800 ppm, preferably BIT in the range of 100-200 ppm.

Not only was availability of the full body of plant nutrients important to the crop, it was also essential to the vigorous health of pollinators, such as honey bees, butterflies, moths, beetles, birds and bumble bees for provision of their full spectra of nutrients when they drew nectar containing vitamins and minerals from plants. In crops of photosynthetic organisms, $Co^{2+}$ is a D-block transition $metal^{2+}$ of the embodiment that is metabolized to Vitamin $B_{12}$. Correction of this deficiency by foliar applications of glycan composites containing, for example, Co-CMS, conferred health benefits, particularly as pollinators and grazers consumed photosynthetic organisms and sap nectar fortified with $B_{12}$ and other nutrients from healthy photosynthetic crops. For example, when 0.0005% Co was formulated as a suitable transition metal and applied to a flowering crop, its fortified metabolites became available from a flower to a honeybee and to its colony. Immediately prior to application to a crop, the concentrate was diluted in water or other agriculturally approved carriers in the range of 1 ppb to 100 ppm, preferably between 10 ppb to 10 ppm. The resultant diluted aqueous solution was applied as a spray drench or root application. For foliar application, the product was supplemented with one or more selections of agriculturally approved foliar surfactant and/or additives. One or more applications were applied per season, preferably 1-2× per month. For further optimization of the flow of photosynthates to sweetness and nectar production, glycan composites were applied within a week of blossoming and harvesting in conjunction with respiration decelerators, ppm cytokinins and ppm gibberellins, for endogenous enhancement of flavor and fortified plant foods.

EXAMPLE 12

Exemplary Invertase-Based Glycan Composite (IGC)
Invertase Deglycosylate Glycans Blends of Glycan Composites

| Ingredient | Range % | Preferred % |
|---|---|---|
| Invertase Deglycosylates | 1 ppb-100 ppm | 0.1-10 ppm |
| Cat | 0.01-10 | 0.05 |
| Citric acids | 0.001-20 | 0.001-15 |
| $Ca^{2+}$ | 0.001-1 | 0.005 |
| Ureas | 0.001-25 | 1-15 |
| IT preservative | 0.001-0.2 | 0.01 |
| Water, QID to 100% | | |

The IGC may be further supplemented with components of transition metal$^{2+}$ coordination complexes selected from D-block transition metals; anionic components; and Mg in trace quantities. Respiration accelerators may be selected from, for example, one or more of aconitic, fumaric, glutaric, malic, oxaloacetic, and succinic acids. Optionally, anionic components may be selected from one or more of polydentate chelants such as EDTA, EDDHA, HeEDTA, DTPA, HBED, MGDA, GLDA, and the like.

IGC Enhances Tomato Quantity and Quality

Under stressful arid conditions for cultivation of tomato, IGC was applied to plants and compared against nutrient controls. IGC significantly enhanced general growth, yield and quality of treated tomatoes over controls. Tomato seeds treated with IGC seed coats showed speedy germination.

Materials and Methods

Tomato cultivar Steak Sandwich Hybrid seeds (Burpee®) seeds were germinated under automatically controlled environmental conditions at 32° in the dark. A week after germination, sprouts were transplanted out of doors for culture in an arid environment of 45°:32° LD; 10% relative humidity; 16:8 h LD; and mostly sunny days with photosynthetically active radiation (PAR) up to 1800 μmol photons m$^{-2}$ s$^{-1}$ at midday. Application of solutions to test plants and control plants under study were made simultaneously and all plants were subjected to identical conditions consistent with good laboratory practices. Chemigations were maintained at sufficiency to keep roots uniformly moistened and drained without water damage. Replicate populations of plants were cultured in plastic TLC Pro 606 trays, each of the 36 cells with 125 ml capacity, until transfer to 33 cm diameter plastic pots containing soil-less media. Control and treated tomatoes were matched for size and vigor; and runts, damaged or diseased plants and seeds were discarded prior to onset in order to produce uniform replicates. Volumes for the three foliar applications were calibrated to 200 L/Ha with 0.1-1 ppm Invertase Deglycosylate glycans blend content in the applied Glycan Composite. Sweetness as an indicator of the level of flavor was measured as Brix of sap nectar squeezed from individual tomatoes using a calibrated digital refractometer (Reichert).

IGC was made according the methods described in EXAMPLE 11 modified to the composition in the IGC Concentrate Table, above. For foliar applications, 0.03-0.05% Sil foliar surfactant was supplemented at label specifications. By application of identical overhead sprays of solution, the same quantities of nutrients were given to all plants.

Seeds were germinated on water-moistened Whatman 598 paper in Gosselin dishes, 20 seeds/dish, and 5 replicates per treatment. Experimental seeds were coated with 0.1 mg IGC, air-dried 48 h and sown. Controls were treated with the same nutrients without IGC. Germination was determined by radicle emergence in 50% of the seeds. After 7 days, sprouts were transplanted into flats.

Each survey pool held replicates for statistical analyses. The differences between treated and control populations were statistically significant in each experiment unless otherwise noted; error bars show 95% confidence intervals.

Results

IGC-coated tomato seeds showed accelerated germination. All replicates of treated seeds showed 50% germination in 60 h. In contrast, Controls showed 50% germination in all dishes after 72 h.

Experiments were designed to determine fruit quality and yield responses to IGC under stressful arid conditions. Field treatments under the aforementioned conditions consistent with decelerated respiration 2 days prior to harvest were compared to nutrient controls to determine effects on sweetness. Regardless of color, twelve of the largest >50 mm diameter tomatoes were harvested 2 days after treatment and live shoot weights were recorded. Half of the controls were red, whereas, all of the treated tomatoes were red. Table 4 shows that appropriate treatment of endogenous photosynthates of sap nectar resulted in enhanced fruit quality, expressed as mean Brix 5.5 that was significantly (p=0.012) improved as greater flavor than nutrient control Brix 4.9.

TABLE 4

| Brix: Enhanced flavor quality of tomato | | |
|---|---|---|
| Mean Brix | Mean Brix | |
| Control | IGC | n = 12 |
| 4.9 | 5.5 | p = 0.012 |

The count of tomatoes per plant is a measure of fruit yield and Table 5 shows that IGC treatment resulted in 3.2 mean fruit count per plant that was significantly (p=0.000; n=12) greater than the mean fruit count of 1.6 per nutrient control plant. The results of treatment with IGC were improved yield, enhanced fruit sap nectar and increased sweetness and flavor qualities in this arid environment.

TABLE 5

Average tomato fruit counts were enhanced by IGC

| Fruit Mean Count | Fruit Mean Count | |
|---|---|---|
| Control | IGC | n = 12 |
| 1.6 | 3.2 | p = 0.000 |

Average total fruit mean weights per tomato plant were analyzed for Nutrient Control and IGC as measures of yield. Table 6, shows IGC treatment resulted in 277 grams wet/14 grams dry weight fruit mean yield per plant that was significantly (p=0.002/p=0.004) higher than control 124 grams wet/14 grams dry mean fruit weight per plant.

TABLE 6

Tomato fruit weight per plant was enhanced by IGC

| Control | IGC | n = 10 |
|---|---|---|
| Wet Weight Mean | | |
| 124 grams/plant | 277 g/plant | p = 0.002 |
| Dry Weight Mean | | |
| 7 grams/plant | 14 g/plant | p = 0.004 |

Responses of various species were surveyed with results displayed in Table 7. Applications were effective on plants known for $C_3$ and $C_4$ metabolism.

TABLE 7

Survey of plants that benefitted from IGC

| Plant | Mode |
|---|---|
| Geranium | Root |
| Petunia | Sprench |
| Lantana | Root |
| Green Tea | Root |
| Impatiens | Foliar |
| Bell Pepper | Foliar |
| Radish | Root |
| Coffee | Root |
| Turf | Sprench |
| Corn | Seed Coat |

Conclusion

Rapid germination after treatment of seeds with IGC was an indication of improved respiration and explained why species of CAM, $C_3$ and $C_4$ responded to glycan composites because all plants respire. Endogenous modulation of photosynthates flux by action of the glycan composite was consistent with tomato Brix elevation of sap nectar to improve flavor quality. Under environmental stress of the arid zone, tomato cultivation by treatment with glycan composites showed enhanced quality and quantity as compared to control. The regulation of flow of photosynthates by IGC was further instituted by optional coapplications of the respiration decelerator, 10-200 ppm cytokinin, for flavor enhancement or respiration accelerators for enhancement of quantity yields. Furthermore, under conditions of $O_2$-starvation, supplementation with the $O_2$-generator, 30-100 ml $H_2O_2$ per plant maintained root health for consistency of high qualities and quantities of yields.

EXAMPLE 13

| Exemplary Partially Hydrolyzed Guar Gum (GG) | | |
|---|---|---|
| Ingredient | Range | % Preferred |
| GG | 1-90 | 3-20 |
| Cat | 1-10 | 5 |
| $Ca^{2+}$ | 0.01-3 | 1 |
| Malic acids | 0.1-50 | 5-25 |
| Ureas | 1-25 | 5-15 |
| BIT | 0.001-0.2 | 0.05 |
| Water, QID to 100% | | QID |

This formulation may be further supplemented with ppb-ppm D-block transition metal$^{2+}$ coordination complex components selected from Zn, Co, Ni; aconitic, citric, fumaric, glutaric, oxaloacetic, and succinic acids; alkylamide chelants; and $Mg^{2+}$.

Photosynthetic organisms thus treated with glycan composites comprised of GG-deglycosylates resulted in enhanced flow of photosynthates for improvement of the quality and quantity of harvests. The regulation of flow of photosynthates by glycan composites comprised of GG was further established by optional coapplications of respiration decelerators for flavor enhancement or respiration accelerators for enhancement of quantity yields.

EXAMPLE 14

Exemplary Partially Hydrolyzed Tara Gum (HTG)

Tara gums are commercially available in bulk quantities and this species contains large polymers of branched Gal-Man$_3$ units suitable for deglycosylation by the aforementioned acetolysis processes. That is, glycan deglycosylates were derived from food grade tara gum by acetolysis (acetic acid:acetic anhydride:sulfuric acid 25:25:1 v/v, 60-80° C., 24-96 h) or nitrolysis (citric acid:acetic anhydride:nitric acid 20:20:10) yielding partially hydrolyzed branched GalMan$_3$-deglycosylates. Glycans as partially Hydrolyzed Tara Gum (HTG) deglycosylates showed high potency in glycan composites between a range of 50-200 ppm concentrations. As a glycan component, HTG was investigated showing activity only in the presence of the glycan composite components, utilizing the methods as follow:

Cabbage was cultivated in environmentally controlled conditions as described above in plastic flats with 36 plants; 125 cc/cell. All aqueous foliar treatment solutions contained 0.5 g Sil/L, pH 6, and included Metals$^{2+}$ in separate formulations of the following: Metals$^{2+}$ 1 ppm manganese sulfate, 1 ppm ferrous sulfate, and 10 ppm calcium nitrate dissolved in water with 50 PPM DAP; Anionic component of the transition metal$^{2+}$ coordination complex-300 ppm potassium α-ketoglutarate, abbreviated aKG; and 100 ppm HTG. Glycan composite components and Metals$^{2+}$ were applied separately and blended together to test plant growth response to the components as compared to the holo-glycan composite. The solutions of aKG, HTG, and aKG+HTG were dissolved in the aqueous Metals$^{2+}$ solution; and, therefore, transition metal$^{2+}$ coordination complexes comprised of aKG, Ca$^{2+}$ and Mn$^{2+}$ were present in the treatment solutions. Metals$^{2+}$ served as the control.

Foliar treatments were applied in a volume of 10 ml/flat, n=36, at expansion of the first true leaves. Shoots were harvested, dried and weighed.

Results of the trials in Table HTG, below, compared the mean dry weights of cabbage shoots to that of Metals$^{2+}$, the stock solution in which all of the treatments were dissolved. The aKG shoots were not significantly (n=36; p=0.057) different in yield than the Metals$^{2+}$ control; HTG with Metals$^{2+}$ showed a significant (n=36, p=0.001) enhancement as compared to Metals$^{2+}$ alone. Finally, aKG+HTG+Metals$^{2+}$ showed the most highly significant (n=36; p=0.000) enhancement of yield as compared to Metals$^{2+}$. Furthermore, the holo-glycan composite showed highly significant (aKG+HTG v aKG, p=0.000; aKG+HTG v HTG, p=0.000) enhancements of yields as compared to all of the other treated populations.

TABLE

HTG

| | Mean dry weight, Gram | p |
|---|---|---|
| Metals$^{2+}$ | 0.56 | |
| aKG | 0.59 | 0.057 |
| HTG | 0.61 | 0.001 |
| aKG + HTG | 0.63 | 0.000 |

In conclusion, the glycan composite showed the most highly significant improvements when formulated together as the holo-glycan composite applied to photosynthetic organisms, targeting photosynthates. Moreover, beneficial responses to holo-glycan composites were confirmed after supplementation with D-block transition metals$^{2+}$; Ca$^{2+}$; and Mg$^{2+}$. The regulation of flow of photosynthates by holo-glycan composites was further instituted by optional coapplications of respiration decelerators for flavor enhancement or respiration accelerators for enhancement of quantity yields.

EXAMPLE 15

Exemplary Partially Hydrolyzed Locust Bean Gum (PHLB)

| Ingredient | Range % | Preferred |
|---|---|---|
| PHLB | 0.1-5 | 1-3 |
| Cat | 1-10 | 5 |
| Ca$^{2+}$ | 0.01-3 | 1 |
| CMS | 0.1-50 | 5-25 |
| AMS | 1-25 | 5-15 |
| BIT | 1-750 ppm | 75-100 ppm |
| Water, QID | | |

This PHLB formulation may be further supplemented with one or more additional D-block transition metals$^{2+}$; anionic components; and/or Mg$^{2+}$. Treating photosynthetic organisms with PHLB resulted in enhanced flow of photosynthates for improvement of the quality and quantity of harvests. The regulation of flow of photosynthates by glycan composites comprised of PHLB was further controlled by optional coapplications of the respiration decelerator, 10-200 ppm salicylic acid, for flavor enhancement.

EXAMPLE 16

Methods and Compositions for Speedy Germination

| Ingredient | Range g/L | Preferred |
|---|---|---|
| Ethan | 1 ppb-1 ppm | 10-100 ppb |
| Glutaric acid | 0.0007-1 | 0.003 |
| KOH | pH 5-7.5 | pH 5.5 |
| Cat | 0.01-5 | 0.1 |
| Ca$^{2+}$ | 0.01-1 | 0.05 |

For germination, this formulation may be further supplemented with anionic components of transition metal$^{2+}$ coordination complexes that are respiration accelerators selected from one or more of aconitic, fumaric, glutaric, malic, oxaloacetic, and succinic acids; and phosphates, thereof.

Radish seeds, 25 per dish, were sown in 16 replicate Gosselin germination dishes on Whatman 598 Seed Culture paper circles moistened with Nutrient Control or glycan composite. Seeds were maintained at a constant temperature of 27° C. in the dark for respiration only. Germination was established at the time at which radicle emergence was observed for 50% of the seeds, $G_{50}$. Results showed accelerated glycan composite mean $G_{50}$=15 hours as compared to Nutrient Control mean $G_{50}$=22 hours; n=8; p=0.001. Treatments of radish by coating seed with 20-50 µg/seed dry weight glycan composite proved highly potent and significantly hastened germination as compared to Nutrient Controls as a result of enhanced flow of photosynthates. Similarly, germination was hastened in radish seeds that were pre-coated and dried with 20-50 µg glycan composite/seed, as compared to Nutrient Controls.

EXAMPLE 17

N-Linked Glycan Composites

| Ingredient | Range ppm | Preferred ppm |
|---|---|---|
| Ethan | 0.001 to 1 | 0.1 |
| Citric acid | 0.001-5 | 0.05 |
| Ca$^{2+}$ | 1-10 | 5 |
| Cat | 0.01-10 | 3 |

This formulation may be further supplemented with anionic components of transition metal$^{2+}$ coordination complexes. For example, the anionic components may be selected from respiration accelerators and polydentate chelants.

Root glycan composites were made in 1 L of water with stirring at room temperature, 25 to 35° C. The formulation was titrated with KOH and/or NH$_4$OH to pH 5-7.5; and 500 to 750 gallons/acre were applied as close to the roots as possible either by drench, spray-drench, sidedressing and/or through chemigation. With irrigation, treatments were watered into the soil toward the roots for enhanced quality and quantity. Applications were applied weekly to monthly as needed during the growing season.

EXAMPLE 18

Invertase Liquid Concentrate

Invertase glycoproteins are comprised of proteins with core and surface Man$_n$ polymers. As such, these glycoproteins were partially hydrolyzed to yield Man$_n$ deglycosylates. When formulated in glycan composites and applied to photosynthetic organisms, invertase deglycosylates modulated the flow of energy from photosynthesis to respiration. Concentrated glycan composite formulations containing N-linked branched chain deglycosylates from invertase were diluted with water to 10 ppb-5 ppm field doses for photosynthetic organisms and were applied to germination assays, showing strongly potent activity at levels as low as 10 ppb invertase deglycosylates.

Glycan composites were further formulated for regulation of flow of photosynthates with optional selections for flavor enhancement from respiration decelerators and enhancement of quantity yields by respiration accelerators. Transition metal$^{2+}$ coordination complexes of invertase deglycosylates may be further selected from anionic components that are respiration accelerators such as from ppm aconitic, fumaric, glutaric, malic, oxaloacetic, and succinic acids. Optionally, anionic components may be selected from polydentate chelants such as ppm EDTA, EDDHA, HeEDTA, DTPA, HBED, MGDA, GLDA, and the like.

Enhanced quality and quantities of crops yields resulted from glycan composite treatments of, for example, blueberry, leafy vegetables, cotton, cereals, tomato, cherry, onion, coffee, banana, citrus, melon, leafy greens, nuts, pomes, berries, tree fruit, food crops, florals, trees, turf and ornamental crops.

Methods

To 40 ml of strong base, preferably selected from 0.2 N KOH, $NH_4OH$, and $Ca(OH)_2$, 10-12 g dry invertase powder with preferred activity 200,000 Sumner Units/g was added with agitation and the aqueous alkaline solution was steamed to 60-80° C. for 2-24 hours. Next, 20 g citric acid was added with stirring and the solution was steamed at 60-80° C. for 3-12 hours. The lower the heating temperature, the longer the incubation; and this process was followed by cooling to room temperature. Suitable base, preferably selected from KOH, $NH_4OH$, and $Ca(OH)_2$ was added with agitation to adjust to pH 4-6. Volume was brought up to QID 100 ml to make 10% invertase deglycosylates. 1-6 ppm Cat stock solution was prepared and 1 ml 10% invertase deglycosylates was diluted in 1 L Cat stock solution for 100 ppm invertase deglycosylates liquid concentrate. 100 ppm BIT was added with agitation to complete invertase deglycosylates liquid concentrate.

Invertase deglycosylates liquid concentrate field dilutions: 10 ml invertase deglycosylates 100 ppm liquid concentrate was diluted in 1 L water to yield 1 ppm invertase deglycosylates, followed by serial dilutions to 1, 10, and 100 ppb, as needed. Foliar applications required addition of one or more agricultural surfactants, such as, 0.5 g/L Sil. Applications of low concentrations, in the range of between 10 ppb-5 ppm invertase deglycosylates were effective and showed significantly earlier germination and enhancement of the qualities and quantities of crops of photosynthetic organisms as compared to control. The regulation of flow of photosynthates by glycan composites comprised of invertase deglycosylates was further adapted by coapplication of the respiration decelerator, 1-100 ppm gibberellin, for flavor enhancement. Furthermore, under conditions of $O_2$-starvation, supplementation of 1 L media with 10 g $CaO_2$ maintained high qualities and quantities of yields.

EXAMPLE 19

Exemplary Partially Hydrolyzed Botanical Gums

Botanical gums were selected for branched chain high mannan contents that were partially hydrolyzed according to the following methods: Guar, konjac, locust bean, tara and ivory nut gums were separately dissolved in 60-80° water with agitation as 1% w/w gums. To each gum solution, 1-3 N nitric acid and 5-25% acetic anhydride were added. The solutions were maintained at 70-80° for 1-8 h. The solutions were cooled to 30-40° and titrated to pH 3.5-4 with $Ca(OH)_2$, KOH and/or $NH_4OH$. To the solutions, 30-50% citric acid was added to saturation and heated to 60-80° C. for 1-24 h. Solutions were allowed to cool to room temperature and titrated to pH 5-6 with $Ca(OH)_2$, KOH, $MnCO_3$ and/or $NH_4OH$. 10× Cat was dissolved into the partially hydrolyzed gum solution to make 0.1% gum. Serial dilutions with Cat provided samples of various doses and were compared with the nutrient control solution. Exemplary components for glycan composites comprised of partially hydrolyzed botanical gums are given in Table of Components, below.

Table of Components

| Component | Range % | Preferred % |
|---|---|---|
| Botanical Gum | 0.01-3 | 0.1 |
| $HNO_3$:Acetic Anhydride:CMS | 5:5:5-25:25:60 | 10:10:50 |
| $NH_4OH$, KOH, $Ca(OH)_2$ | pH 3-6 | pH 5.5 |
| Transition metal$^{2+}$ coordination complex | 0.01-1 | 0.1 |
| Ca-coordination complex | 0.01-3 | 0.1 |

Bioassay

Radish seeds, 30 per dish, were sown in 20 replicate Gosselin germination dishes on moistened Whatman 598 Seed Culture paper circles. Seeds were maintained at a constant temperature of 27° in the dark to maintain only respiration. Germination was established at the time at which radicle emergence was observed for 50% of the seeds, $G_{50}$.

Results showed faster glycan composite mean $G_{50}$ at 15 hours as compared to Nutrient Control mean $G_{50}$ at 22 hours; n=10; p=0.001. Potencies of various partially hydrolyzed (PH) gums showed general correspondence of concentrations necessary for $G_{50}$ activity to their contents of branched mannans. Potencies were observed from low activity in PH gums of guar, konjac, locust bean, tara, and to high activity by PH ivory nut, as detailed in the Table of Active Doses (ppm) of Partially Hydrolyzed (PH) Gums.

Treatments of radish seed with glycan composites from different sources of gums showed different levels efficacy and significantly hastened germination as compared to Nutrient Controls. Speedy germination was a result of endogenously enhanced flow of photosynthates. Preferred respiration accelerators included citric and malic acids. Furthermore, under conditions of $O_2$-starvation, root supplementation of each 1 L media with 20 g $CaO_2$ maintained root vigor for high qualities and quantities of yields.

Table of Active Doses (Ppm) of Partially Hydrolyzed (PH) Gums

| |
|---|
| 100 ppm GG |
| 30 ppm PH Konjac |
| 20 ppm PH Locust Bean |
| 20 ppm PH Tara |
| 10 ppm PH Ivory Nut |

EXAMPLE 20

Exemplary Invertase Glycan Composite Liquid Concentrate

Materials: MaxInvert 200 invertase powder (DSM) Citric Acid, anhydrous (Brandt)

A highly concentrated liquid solution of Invertase Glycan Composite was prepared by denaturing and deglycosylating active invertase with heating to 80° in saturated citrate solution. A saturated 50% citric acid was first prepared in water. To 500 ml saturated citric acid solution, 100 g MaxInvert 200 invertase dry powder was slowly added into the agitated (300-800 rpm) acid solution to avoid clumping. After the invertase was dispensed, stirring was reduced to 100 rpm to minimize foaming. The solution was heated to 80°; and maintained at 75-85° for 8 hours with slow 100 rpm stirring that resulted in deglycosylates, a blend of Glycan components of the Glycan Composite, from this process that partially hydrolyzed invertase. After cooling to room temperature, the preservative, 100 ppm BIT was added with stirring and the total volume was brought to 500 ml with water to make a 20% Glycan solution.

The Metal$^{+2}$ concentrate stock was prepared, containing the following: ultra low biuret urea; Ca; Mn; Fe; Zn; Mg; random block copolymer emulsifier, such as, Pluronic L-62; lower aliphatic alcohols, preferably, propanols; preservatives, such as, BIT; concentrations of each component per Table Invertase Glycan Composite Concentrate. A measure of 5 ml 20% Glycan was diluted per 10 L Metal$^{+2}$ concentrate stock for 100 ppm Glycan Composite; and titrated with citric acid, KOH, and/or NH$_4$OH between pH 5-8. This 100 ppm Glycan Composite product was prepared for field dilutions to 0.01-1% in water for applications to photosynthetic organisms. For example, 10 ml Glycan Composite in 1 L water yielded 1 ppm Glycan; and similarly, 1 gallon/100 gallons per acre or 3 fluid ounce/1000 foot$^2$. Serial dilutions also were applied, as needed. The field-diluted Glycan Composite from invertase deglycosylate was effective in a range of 0.01 to 10 ppm Glycan on roots; and/or with label rates of foliar surfactant additives, 0.1 to 10 ppm Glycan proved effective when applied to shoots.

Table Invertase Glycan Composite Concentrate

| | pH 7-8 | |
|---|---|---|
| Input Components | Preferred g/10 L | % Range |
| Water | 8617 | 60-90 |
| 20% Glycan | 5 | 0.01-10 |
| Urea | 700 | 5-25 |
| Mg 2.5%, EDTA | 200 | 1-10 |
| Mn 6%, EDTA | 50 | 0.3-5 |
| Fe 7%, EDTA | 100 | 0-10 |
| Ca 3%, Citrate | 68 | 0.5-5 |
| Zn 9%, Acetate | 50 | 0.3-5 |
| Pluronic L-62 | 100 | 1-6 |
| Isopropanol | 100 | 0.5-10 |
| BIT | 6 | 0.08-0.3 |

Although specific features of the embodiments disclosed herein are described with respect to one example and not others, this is for convenience only as some feature of one described example may be combined with one or more of the other examples in accordance with the methods and formulations disclosed herein.

Other permutations of the methods and formulations of the embodiments disclosed herein will occur to those skilled in the art and are within the following claims:

What is claimed is:

1. A method of enhancing the respiratory growth of a photosynthetic organism, comprising applying to said organism an effective amount of a formulation comprising a glycan composite comprising one or more branched glycan deglycosylates and one or more transition metal$^{2+}$ coordination complexes.

2. The method of claim 1, wherein said glycan deglycosylate is selected from the group consisting of O-linked glycans and N-linked glycans with Gly$_{m-n}$, where m=1-8 and n=1-8.

3. The method of claim 1, wherein said one or more transition metal$^{2+}$ coordination complexes comprise both metals$^{2+}$ components and one or more anionic components.

4. The method of claim 3, wherein said anionic component of the transition metal$^{2+}$ coordination complex in said glycan composite is selected from the group consisting of polydentate alkylamide chelants, respiration accelerators, aconitates, citrates, fumarates, glutarates, malates, oxaloacetates, succinates, acids, salts, esters and derivatives thereof.

5. The method of claim 1, wherein said branched glycan deglycosylate has a mannopyranosyl-terminal ligand.

6. The method of claim 1, wherein said branched glycan deglycosylate is selected from the group consisting of O-linked-Glycans, Man$_n$, Gal$_m$Man$_n$, Gal$_m$Man$_n$, Glc$_m$-Man$_n$, Gal$_j$Glc$_m$Man$_n$, and polymannosyl core structures; j=1-8, m=1-8, n=1-8; derivatives and combinations thereof.

7. The method of claim 1, wherein said branched glycan deglycosylate is selected from one or more of the group consisting of N-linked-glycans, Man$_n$N-glycans, Man$_3$N-glycans, Man$_n$GlcNAc$_2$, Man$_{4-7}$GlcNAc$_{1-2}$, Man$_{1-24}$GalNAc$_{1-2}$, Man$_{1-3}$GlcNAc$_{1-2}$, Man$_{8-15}$GlcNAc$_{1-2}$, derivatives and combinations thereof, wherein n is 1 to 24.

8. The method of claim 6, wherein said O-linked-glycan in said glycan composite is selected from the group consisting of aryl-, acyl-, alkyl(Gly)$_n$, alkyl(Glc)$_n$, alkyl(Man)$_n$, methyl(Man)$_n$, methyl-D-Man$_n$, methyl-D-Glc$_n$Man$_2$Gal, Man$_2$Gal$_2$, ManGal$_2$, Man$_3$, Man$_3$Gal, Man$_2$Glc, and combinations thereof, wherein n=1 to 8.

9. The method of claim 1, wherein said branched glycan deglycosylate is:

10. The method of claim 1, wherein said one or more transition metal$^{2+}$ coordination complexes comprise both manganese, Mn$^{2+}$, and calcium, Ca$^{2+}$, and wherein said one or more transition metal$^{2+}$ of said transition metal$^{2+}$ coordination complexes comprises one or more D-Block transition metals$^{2+}$ selected from the group consisting of Fe$^{2+}$, Co$^{2+}$, Ni$^{2+}$ and Zn$^{2+}$.

11. The method of claim 1, wherein said glycan composite further comprises one or more preservatives.

12. The method of claim 1, wherein said branched glycan deglycosylates are selected from one or more of invertase enzymes, denatured invertases, partially hydrolyzed invertases, and invertase deglycosylates; and blends, thereof.

13. The method of claim 1, wherein the glycan composite formulation comprises one or more Ca$^{2+}$-Mn$^{2+}$-transition metal$^{2+}$ coordination complexes and one or more GlcNAc$_{1-3}$ Glycan deglycosylates.

14. A method of enhancing the respiratory growth of a photosynthetic organism that produces sap nectar, comprising applying to said sap nectar produced by said photosynthetic organism an effective amount of a formulation comprising a glycan composite comprising one or more branched glycan deglycosylates and one or more transition metal$^{2+}$ coordination complexes.

15. The method of claim 1, wherein said photosynthetic organism is a flowering plant.

16. The method of claim 12, wherein said partially hydrolyzed invertases are deglycosylated by citric acids.

17. The method of claim 1, wherein said photosynthetic organism produces photosynthates, and wherein said glycan composite is applied to said photosynthetic organism to endogenously enhance flavor.

18. The method of claim 4 wherein said respiration accelerators are applied in conjunction with $O_2$-generators selected from the group consisting of $H_2O_2$, $CaO_2$ and $MgO_2$.

19. A method of claim 1 wherein the application of said glycan composite to said photosynthetic organism is in an amount effective to enhance the hydrostatic pressure of a photosynthetic organism.

\* \* \* \* \*